US006389030B1

(12) United States Patent
Coden

(10) Patent No.: US 6,389,030 B1
(45) Date of Patent: May 14, 2002

(54) INTERNET ACCESS OVER A RING NETWORK

(75) Inventor: Michael H. Coden, Riverdale, NY (US)

(73) Assignee: ADC Telecommunications, Inc.

( * ) Notice: Subject to any disclaimer, the term of this patent is extended or adjusted under 35 U.S.C. 154(b) by 0 days.

(21) Appl. No.: 09/137,721

(22) Filed: Aug. 21, 1998

(51) Int. Cl.[7] ........................ H04L 12/56; H04L 12/433
(52) U.S. Cl. ........................ 370/404; 370/255; 370/258; 370/400; 370/401; 370/403; 709/242; 709/251
(58) Field of Search ................................. 370/258, 351, 370/389, 400, 909, 912, 254, 255, 401, 403, 404; 379/113, 114, 133, 243, 258, 308, 350, 900; 709/251, 208, 223, 224, 242

(56) References Cited

U.S. PATENT DOCUMENTS

| 4,293,948 A | 10/1981 | Soderblom |
| 4,553,234 A | 11/1985 | Brandsma et al. |
| 4,706,080 A | 11/1987 | Sincoskie ............... 340/825.02 |
| 4,750,171 A | 6/1988 | Kedar et al. |
| 4,752,924 A | 6/1988 | Darnell et al. |
| 4,757,497 A | 7/1988 | Beierle et al. |
| 4,836,317 A | 6/1989 | Straussmann et al. ...... 178/2 R |
| 4,908,824 A | 3/1990 | Leibe et al. |
| 4,933,937 A | 6/1990 | Konishi |
| 4,947,390 A | 8/1990 | Sheehy |
| 5,003,531 A | 3/1991 | Farinholt et al. |
| 5,086,426 A | 2/1992 | Tsukakoshi et al. |
| 5,101,405 A | 3/1992 | Bekki et al. |
| 5,105,188 A | 4/1992 | Jung et al. ............... 340/825.05 |
| 5,107,490 A * | 4/1992 | Wilson et al. ............. 370/85.3 |
| 5,179,548 A | 1/1993 | Sandesara |
| 5,218,603 A | 6/1993 | Watanabe |
| 5,220,562 A | 6/1993 | Takada et al. |

(List continued on next page.)

OTHER PUBLICATIONS

M. Zitterbart, A. Tantawy, and D. Serpanos, A High Performance Transparent Bridge, IEEE/ACM Transactions on Networking, vol. 2, No. 4, Aug. 1994. pp. 352–362.*
Bucci, G., et al., "Design and performance evaluation of a high throughput Tthernet/FDDI Interconnect", Proceeding Advanced computer Technology, Reliable Systems and Applications; 5th Annual European Computer Conference, Bologna, pp. 89–93, (May 13–16, 1991).
Bucci, G., et al., "Performance Analysis of Two Different Algorithms for Ethernet–FDDI Interconnection", IEEE Transactions on Parallel and Disbributed Systems, vol. 5, No. 6, pp. 614–629, (Jun. 1994).
Ohteru, Y., "Interconnecting IEEE 802 LANS by a wideband backbone network", *IEEE*, pp. 130–135, (1987).

Primary Examiner—Hassan Kizou
Assistant Examiner—Joe Logsdon
(74) Attorney, Agent, or Firm—Fogg, Slifer & Polglaze, P.A.

(57) ABSTRACT

A telecommunications network is provided. The network uses a ring of ring switches to provide a transport mechanism for data packets that is transparent to the data and protocols contained in the data packets. This transport mechanism is simple and low cost to implement. Such networks can carry, for example, data to and from the Internet to a subscriber with a cable modem hook-up to a cable network or a DSL modem connection to a copper wire DSL enabled telephone network.

28 Claims, 14 Drawing Sheets

U.S. PATENT DOCUMENTS

| | | | |
|---|---|---|---|
| 5,247,381 A | * 9/1993 | Olmstead et al. | 359/118 |
| 5,295,012 A | * 3/1994 | Wilson et al. | 359/135 |
| 5,301,185 A | 4/1994 | Cherry | |
| 5,327,431 A | * 7/1994 | Heske, III et al. | 370/85.5 |
| 5,337,309 A | 8/1994 | Faulk | |
| 5,412,652 A | * 5/1995 | Lu | 370/85.12 |
| 5,444,692 A | 8/1995 | Basso et al. | |
| 5,471,472 A | * 11/1995 | McClure et al. | 370/85.13 |
| 5,477,540 A | 12/1995 | Yang et al. | |
| 5,483,536 A | 1/1996 | Gunji et al. | |
| 5,490,252 A | 2/1996 | Macera et al. | 395/200.1 |
| 5,495,232 A | 2/1996 | Kochem et al. | 340/825.05 |
| 5,497,370 A | 3/1996 | Hamada et al. | |
| 5,581,710 A | 12/1996 | Noel et al. | 395/200.21 |
| 5,600,366 A | 2/1997 | Schulman | 348/9 |
| 5,610,905 A | 3/1997 | Murthy et al. | 370/401 |
| 5,617,421 A | 4/1997 | Chin et al. | 370/402 |
| 5,651,000 A | 7/1997 | Lee et al. | 370/258 |
| 5,651,003 A | 7/1997 | Pearce | 370/395 |
| 5,652,615 A | 7/1997 | Bryant et al. | 348/9 |
| 5,657,314 A | * 8/1997 | McClure et al. | 370/401 |
| 5,657,327 A | 8/1997 | Hamada et al. | 370/389 |
| 5,659,543 A | 8/1997 | Ater et al. | 370/258 |
| 5,684,800 A | 11/1997 | Dobbins et al. | 370/401 |
| 5,781,549 A | * 7/1998 | Dai | 370/398 |
| 5,802,278 A | * 9/1998 | Isfeld et al. | 395/200.02 |
| 5,815,490 A | * 9/1998 | Lu | 370/223 |
| 5,822,018 A | 10/1998 | Farmer | 348/705 |
| 5,845,069 A | 12/1998 | Winiger | |
| 5,857,075 A | * 1/1999 | Chung | 395/200.53 |
| 5,872,783 A | 2/1999 | Chin | 370/392 |
| 5,892,922 A | 4/1999 | Lorenz | 395/200.68 |
| 5,909,549 A | * 6/1999 | Compliment et al. | 395/200.53 |
| 5,909,686 A | 6/1999 | Muller et al. | 707/104 |
| 5,920,566 A | 7/1999 | Hendel et al. | 370/401 |
| 5,946,313 A | * 8/1999 | Allan et al. | 370/397 |
| 5,961,597 A | * 10/1999 | Sapir et al. | 709/224 |
| 5,978,373 A | * 11/1999 | Hoff et al. | 370/392 |
| 6,011,780 A | * 1/2000 | Vaman et al. | 370/237 |
| 6,012,099 A | * 1/2000 | Chung | 709/249 |
| 6,049,528 A | * 4/2000 | Hendel et al. | 370/235 |
| 6,049,824 A | * 4/2000 | Simonin | 709/219 |
| 6,112,232 A | * 8/2000 | Shahar et al. | 709/217 |
| 6,115,385 A | * 9/2000 | Vig | 370/401 |
| 6,122,667 A | * 9/2000 | Chung | 709/228 |
| 6,154,462 A | * 11/2000 | Coden | 370/403 |
| 6,208,647 B1 | * 3/2001 | Deng et al. | 370/390 |
| 6,262,988 B1 | * 7/2001 | Vig | 370/401 |

\* cited by examiner

INTERNET ACCESS OVER A RING NETWORK

CROSS REFERENCE TO RELATED CASES

This application is related to US Pat. No. 6,154,464, entitled Circuits and Methods for a Ring Network, issed on Nov. 28, 2000 and to US Pat. No. 6,049,824, entitled System and Method for Modifying an Information Signal In Telecommunications System, issued on Apr. 11, 2000, which US Patents are incorporated herein by reference.

This application is related to the following co-pending applications:

Ser. No. 09/138,232, entitled Transport of Digitized Signals Over a Ring Network, filed on Aug. 21, 1998, pending.

Ser. No. 09/137,722, entitled Control Data Over a Ring Network, filed on Aug. 21, 1998, pending.

Each of these Applications is incorporated by reference.

This application is also related to Application Ser. No. 09/137,669, entitled Telecommunication Network with Variable Address Learning, Switching and Routing, filed on Aug. 21, 1998, pending.

TECHNICAL FIELD OF THE INVENTION

The present invention relates generally to the field of telecommunications and, in particular, to Internet access over a ring network.

BACKGROUND

The Internet has become a leading tool for communicating information in business, personal and professional settings. For example, the Internet allows users to shop, read the news of the day, investigate stock prices, and even send electronic mail over vast distances with the click of a button. Services like America-On-Line, CompuServe and Prodigy have brought the Internet to mainstream society. One problem with the Internet is the slow access speeds when downloading large quantities of data.

Much faster access is provided by cable companies using cable data modems. Cable data modems typically include an Ethernet interface for coupling to a computer at the subscriber's location. These modems are connected over a coaxial cable to a cable head end modem system at a hub site of the cable network. The cable head end modem system includes an Ethernet interface for exchanging signals with a backbone network such as a Synchronized Optical Network (SONET) ring. This Ethernet interface is conventionally coupled to a SONET multiplexer of the SONET ring through a router, often with the added complexity of converting Ethernet packets to ATM cells. At the head end of the cable system, a router and SONET multiplexer provide a connection to an Internet service provider and ultimately, the Internet.

SONET rings were developed around the ability to transport low bandwidth (64 kbps) voice channels in a high speed ring network for telephony service. SONET rings are expensive and cumbersome when handling high bandwidth signals commonly associated with exchanging data on the Internet which typically uses variable sized packets, similar to those that would be used in a system that was meant to carry packetized video as well as packetized Voice over IP, and other digitized services, on the same network. This is, in part, due to the fact that SONET equipment typically works with fixed sized channels of 64 kbps and therefore usually requires small fixed sized data packets, e.g., asynchronous transfer mode (ATM) cells, which can be small in comparison to the variable length data packets used on the Internet.

For the reasons stated above, and for other reasons stated below which will become apparent to those skilled in the art upon reading and understanding the present specification, there is a need in the art for a network that allows the efficient transport of high bandwidth digital data, e.g., Internet signals, in a ring network.

SUMMARY OF THE INVENTION

The above-mentioned problems with telecommunications systems and other problems are addressed by the present invention and will be understood by reading and studying the following specification. A telecommunications network is described which uses a ring of ring switches to provide a backbone transport mechanism for data packets that is transparent to the data and protocols contained in the data packets. The ring switches can include a number of different features, alone or in combination, to implement this backbone network. Ring switches with such features are described in detail in the U.S. Pat. No. 6,154,462, entitled Circuits and Methods for a Ring Network, issued on Nov. 28, 2000, and in Section III below. The ring switches include, but are not limited to the following:

1. A ring switch in which packets are switched on to a unidirectional ring based on comparing a destination identifier, which may already be in the packet, to a table in the ring switch.
2. A ring switch in which packets are switched off and removed from the unidirectional ring based on comparing a destination identifier, which may already be in the packet, to a table in the ring switch thus freeing bandwidth for use by other devices and switches on the ring.
3. A ring switch in which packets received from a unidirectional ring, are placed back on the unidirectional ring based on comparing a destination identifier, which may already be in the packet, to a table in the ring switch.
4. A ring switch in which packets which have traveled completely around the ring are terminated by comparing a source identifier which may be already in the packet to a table, a switch identifier that was added by the ring switch to a table, or a hop counter that has reached a threshold value.
5. A ring switch in which no modification is made to the original packet in order to cause the packet to transmit from the local ports of one ring switch, around the ring to the local ports of another ring switch because the destination identifiers used to compare to the table are already contained in the original packet.
6. A ring switch in which no modification is made to the original packet in order to cause the packet to be terminated when the packet has traveled completely around the ring because the source identifiers used to compare to the table are already contained in the original packet.
7. A ring switch in which the tables are built automatically (self learned) by virtue of reading the source identifiers of each packet received by the ring switch.
8. A ring switch in which the original packet is modified slightly by the ring switch when placing the packet on a unidirectional ring by the addition of a switch identifier such that when the packet has traveled completely around the ring and back to the originating ring switch, the packet is terminated by detecting its own switch identifier.

9. A ring switch in which the original packet is modified slightly by the ring switch when placing the packet on the unidirectional ring by the addition of a counter, such that when the packet passes through each ring switch, the counter is incremented (or decremented) and the packet is terminated by any switch when the counter reaches a selected value.

This transport mechanism is simple and low cost to implement. Such networks can carry, for example, data to and from the Internet to a subscriber with a cable modem hook-up to a cable network or a DSL modem hook-up to a copper wire DSL network.

DETAILED DESCRIPTION

The following detailed description refers to the accompanying drawings which form a part of the specification. The drawings show, and the detailed description describes, by way of illustration specific illustrative embodiments in which the invention may be practiced. These embodiments are described in sufficient detail to enable those skilled in the art to practice the invention. Other embodiments may be used and logical, mechanical and electrical changes may be made without departing from the scope of the present invention. The following detailed description is, therefore, not to be taken in a limiting sense.

I. First Embodiment

Figure 1:
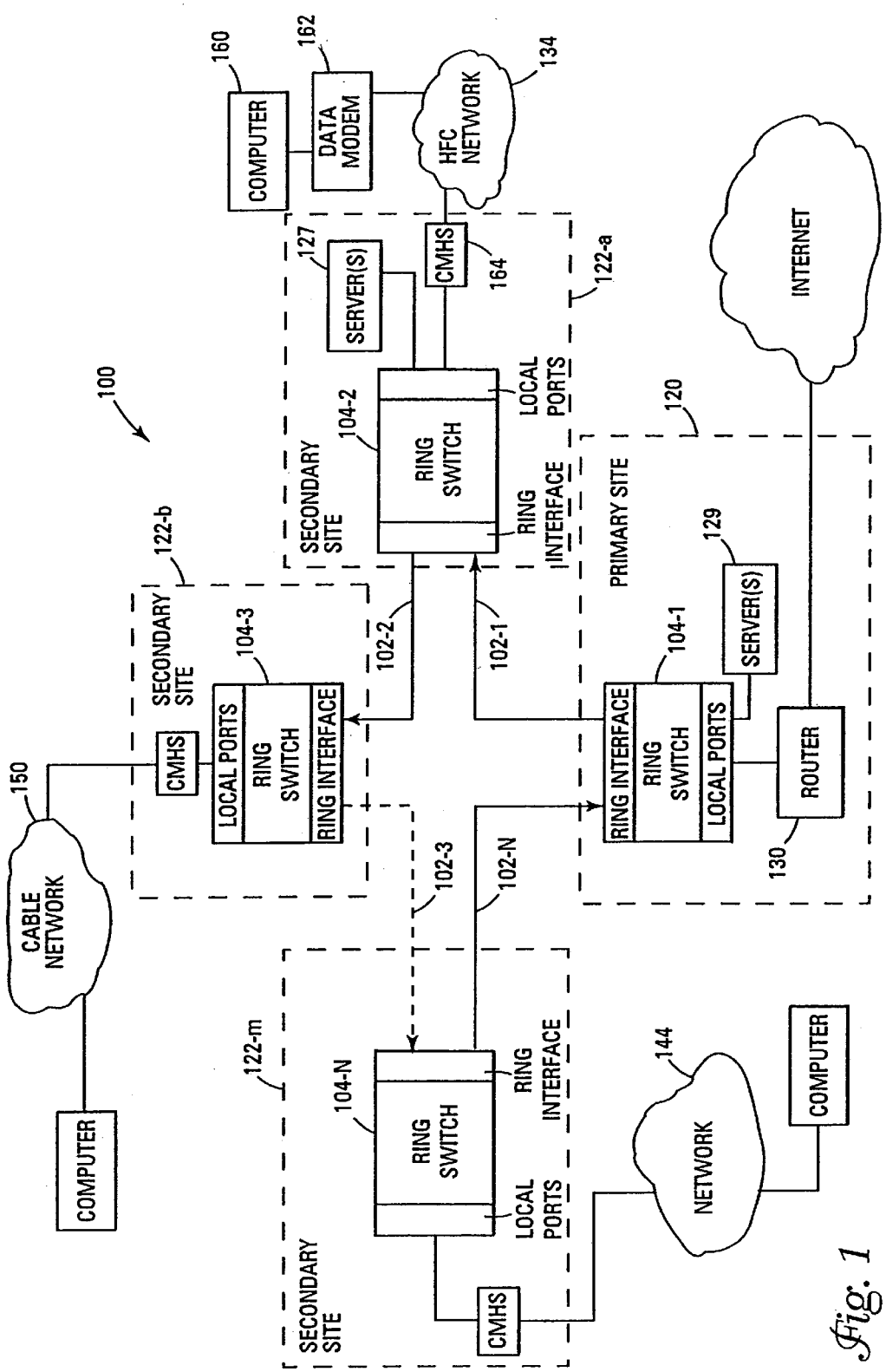
FIG. 1 is a block diagram of an embodiment of a network for providing access to the Internet according to the teachings of the present invention.

FIG. 1 is a block diagram of an embodiment of a network, indicated generally at 100, for providing access to the Internet according to the teachings of the present invention. For purposes of this application, the term "Internet" means an interconnection of a number of data networks and includes, but is not limited to, the network known as the "world wide web". The term "Internet" also includes other existing and later developed networks that allow users to access various kinds of data.

Network 100 transports data packets from the Internet via head end 120 over a ring of ring switches 104-1 through 104-N to deliver the signals to the subscribers. Ring switches 104-1 through 104-N are constructed according to U.S. Pat. No. 6,154,462, entitled Circuits and Methods for a Ring Network, issued on Nov. 28, 2000, and Section III below. These ring switches provide a transport mechanism that is transparent to the data and protocols contained in the data packets. For purposes of this specification, the term "ring switch" includes, but is not limited to:

1. A ring switch in which packets are switched on to a unidirectional ring based on comparing a destination identifier, which may already be in the packet, to a table in the ring switch.

2. A ring switch in which packets are switched off and removed from the unidirectional ring based on comparing a destination identifier, which may already be in the packet, to a table in the ring switch thus freeing bandwidth for use by other devices and switches on the ring.

3. A ring switch in which packets received from a unidirectional ring, are placed back on the unidirectional ring based on comparing a destination identifier, which may already be in the packet, to a table in the ring switch.

4. A ring switch in which packets which have traveled completely around the ring are terminated by comparing a source identifier which may be already in the packet to a table, a switch identifier that was added by the ring switch to a table, or a hop counter that has reached a threshold value.

5. A ring switch in which no modification is made to the original packet in order to cause the packet to transmit from the local ports of one ring switch, around the ring to the local ports of another ring switch because the destination identifiers used to compare to the table are already contained in the original packet.

6. A ring switch in which no modification is made to the original packet in order to cause the packet to be terminated when the packet has traveled completely around the ring because the source identifiers used to compare to the table are already contained in the original packet.

7. A ring switch in which the tables are built automatically (self learned) by virtue of reading the source identifiers of each packet received by the ring switch.

8. A ring switch in which the original packet is modified slightly by the ring switch when placing the packet on a unidirectional ring by the addition of a switch identifier such that when the packet has traveled completely around the ring and back to the originating ring switch, the packet is terminated by detecting its own switch identifier.

9. A ring switch in which the original packet is modified slightly by the ring switch when placing the packet on the unidirectional ring by the addition of a counter, such that when the packet passes through each ring switch, the counter is incremented (or decremented) and the packet is terminated by any switch when the counter reaches a selected value. Further, this transport mechanism is simple and low cost to implement to provide, for example, access to the Internet.

For purposes of this specification, the term data packets includes Ethernet, Token Ring, FDDI, Asynchronous Transfer Mode ("ATM") and other data packets with a format that includes at least a source identifier (e.g., address), a destination identifier, payload data, and, optionally, an error correction code such as a cyclical redundancy check. The payload data may comprise, for example, video data (with or without compression), audio data, Internet data, other data, or any appropriate combination of data-types.

The term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to 1-megabit Ethernet, known as "StarLAN", 10-megabit Ethernet, 100-Megabit Ethernet, known as "Fast Ethernet", 1-gigabit Ethernet, known as "Gigabit Ethernet" and any future CSMA/CD protocols at any other data rates.

The backbone network will typically consist of a primary site and at least one secondary site. The term "primary site" includes the head end of a Cable Television network, the Central Office of a telephone system, and other types of main control sites in telecommunications networks. All three of these terms: primary site, head end and central office may be used interchangeably. The term "secondary site" includes the hubs or remote head ends of a Cable Television network, the Satellite Offices of a telephone system, and other types of remote sites in a telecommunications network. All three of these terms: secondary site, hub and satellite office may be used interchangeably.

A. The Primary Site

Primary site 120 (e.g., head end of a cable television network) provides a connection to the Internet for network 100. Primary site 120 includes a router 130 that connects the ring switch 104-1 with the Internet.

In one embodiment, primary site 120 includes servers 129. Servers 129 include, for example, a proxy server, domain name server, dynamic host central protocol server, mail server, or any other appropriate server. Further, primary site 120 could include one or more of these servers in a specific implementation. It is noted that secondary sites 122-*a*, . . ., 122-*m* also may include similar servers 127.

B. The Transport Ring

Ring switches 104-1 through 104-N are coupled in a ring by transmission medium 102-1 through 102-N. Transmission medium 102-1 through 102-N may comprise, for example, a ring of fiber transport systems such as a number of DV6000 fiber transport systems, available from ADC Telecommunications of Minnetonka, Minnesota, and associated fiber optic cable. The DV6000 provides 16 channels of capacity for transporting data. In one embodiment, only one channel of the DV6000 is used to transmit the data packets. The other channels may be used for additional ring switch networks or other purposes, e.g., video, voice or other data transmission. Alternatively, transmission medium 102-1 through 102-N may be implemented with other conventional transport mechanisms such as, for example, wireless transceivers, fiber optic cables and transceivers, coaxial cables and transceivers, or other appropriate medium for transmitting data packets between the ring switches in network 100.

Ring switches 104-1 through 104-N each include one or more local ports. The local ports are coupled to local networks, e.g., hybrid fiber/coax (HFC) network 134, cable network 150, and network 144. These locals could, alternatively, comprise a copper wire network with a digital subscriber loop interface. The local networks carry data between the ring and the network devices of local subscribers. The local ports can include ports are configured for use with Ethernet, Token Ring, ATM, FDDI or other priate network protocols. As used in this specification, the term "network vices" includes, but is not limited to, hubs, computer terminals and workstations, routers, switches, gateways, televisions, high definition televisions and and other devices that are conventionally coupled to a network.

C. Operation of the Network

In operation, network 100 provides two-way communication between subscribers and the Internet. Data packets are switched on and off the transport ring of network 100 based on destination identifiers, e.g., Media Access Control (MAC) addresses, Internet Protocol (IP) addresses, or other appropriate identifiers, of the packets transported over the network.

In the downstream direction, data packets are sent from the Internet to a computer that is coupled to network 100. For example packets destined for computer 160 begin at the Internet. These packets are provided to primary site 120 at router 130. Router 130 passes these packets to ring switch 104-1 in an appropriate format, e.g., Ethernet packets. These packets are transmitted to ring switch 104-2 over transmission medium 102-1 and are switched off the ring at ring switch 104-2. Cable modem head end system (CMHS) 164 receives the packets and passes the packets over network 134 to data modem 162. Modem 162 is provides the packets to computer 160 in, for example, Ethernet format.

In the upstream, computer 160 requests data from the Internet. This request is transmitted over network 134 from modem 162 to CMHS 164. The packets are placed on the ring of network 100 at switch 104-2 and are transmitted around the ring. At ring switch 104-1, the packets are transmitted off the ring and provided by router 130 to the Internet.

Advantageously, it is noted that no conversion is necessary when transmitting packets from a local port over the ring network to another local port unlike conventional use of SONET rings with ATM packets.

II. The Second Embodiment

Figure 2:
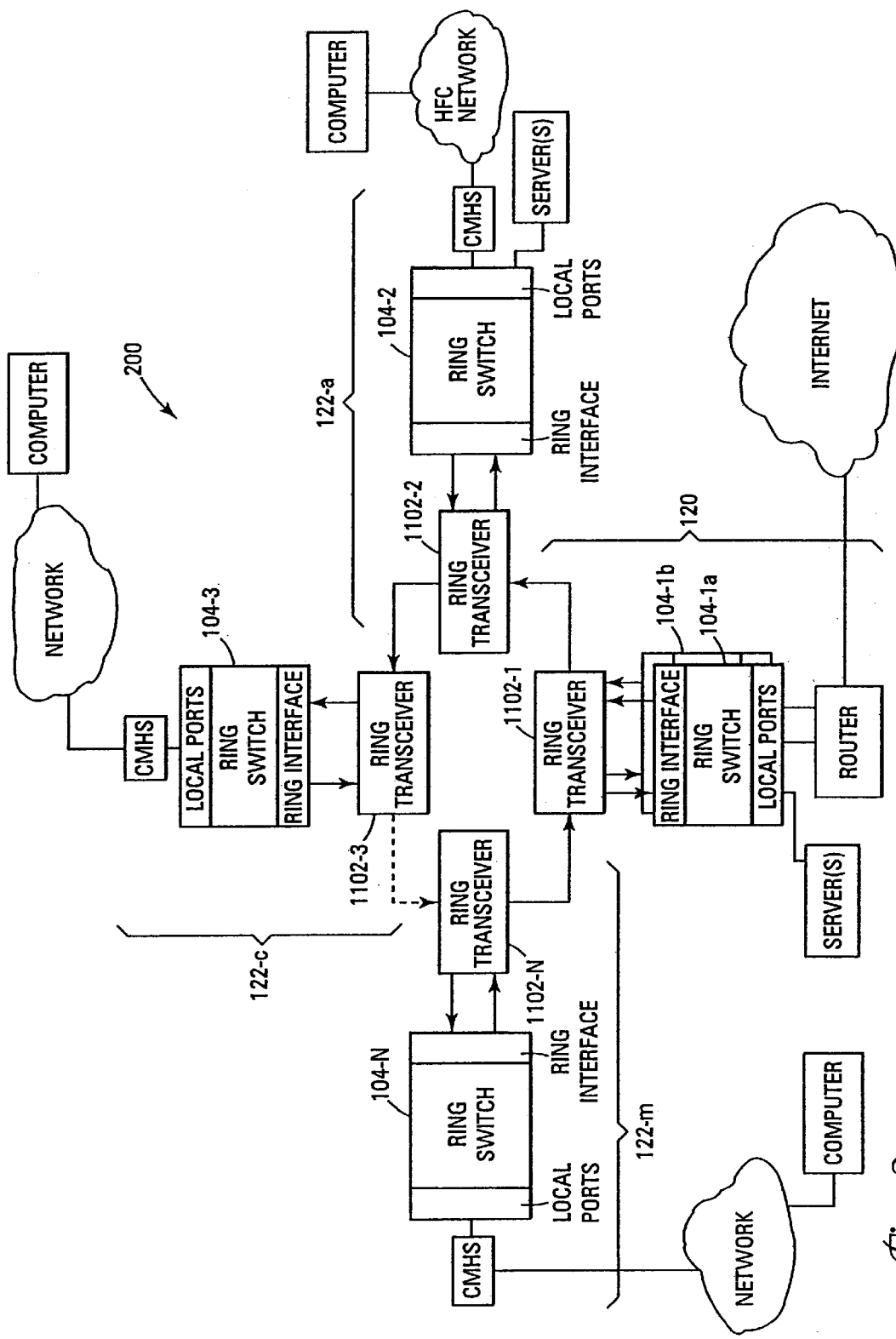
FIG. 2 is a block diagram of another embodiment of a network for providing access to the Internet according to the teachings of the present invention.

FIG. 2 is a block diagram that illustrates another embodiment of a network, indicated generally at 200, for transporting data packets between subscribers and the Internet. This embodiment provides two times the capacity of network 100 by simply adding a second ring switch at the primary site 120. Advantageously, a backbone of ring switches of the type described above with respect to FIG. 1 combine to create a ring network that is easily, and cost-effectively expanded with increased demands for access to the network.

In this embodiment, ring transceivers 1102-1 through 1102-N are coupled to form a unidirectional ring for transmitting data packets between ring switches of network 200. Ring switches 104-1*a*, 104-1*b* are associated with ring transceiver 1102-1 and ring switches 104-2, . . . , 104-N are associated with ring transceivers 1102-2 through 1102-N, respectively. Ring transceivers 1102-1 through 1102-N may comprise, for example, a number of DV6000 fiber transport systems available from ADC Telecommunications of Minnetonka, Minnesota. The DV6000 provides 16 channels of capacity for transporting data. In this embodiment, two channels of the DV6000 at primary site 120 are used to transmit the packets in network 200. At the primary site 120, ring switch 104-1*a* transmits packets on a first channel or time slot of ring transceiver 1102-1 and ring switch 104-1*b* transmits packets on a second channel or time slot of ring transceiver 1102-1. The remaining ring switches 104-2, . . . , 104-N are selectively programmed to receive data packets on one of the two channels. Thus, network 200 includes two rings of ring switches over one ring of transceivers by the addition of one ring switch at the primary site.

Each channel of the DV6000 has a capacity to carry, for example, 100 Mbps of data. Thus, by adding the second ring switch at primary site 120, the capacity of network 200 increases from 100 Mbps to 200 Mbps.

III. Other Embodiments

Figure 3:
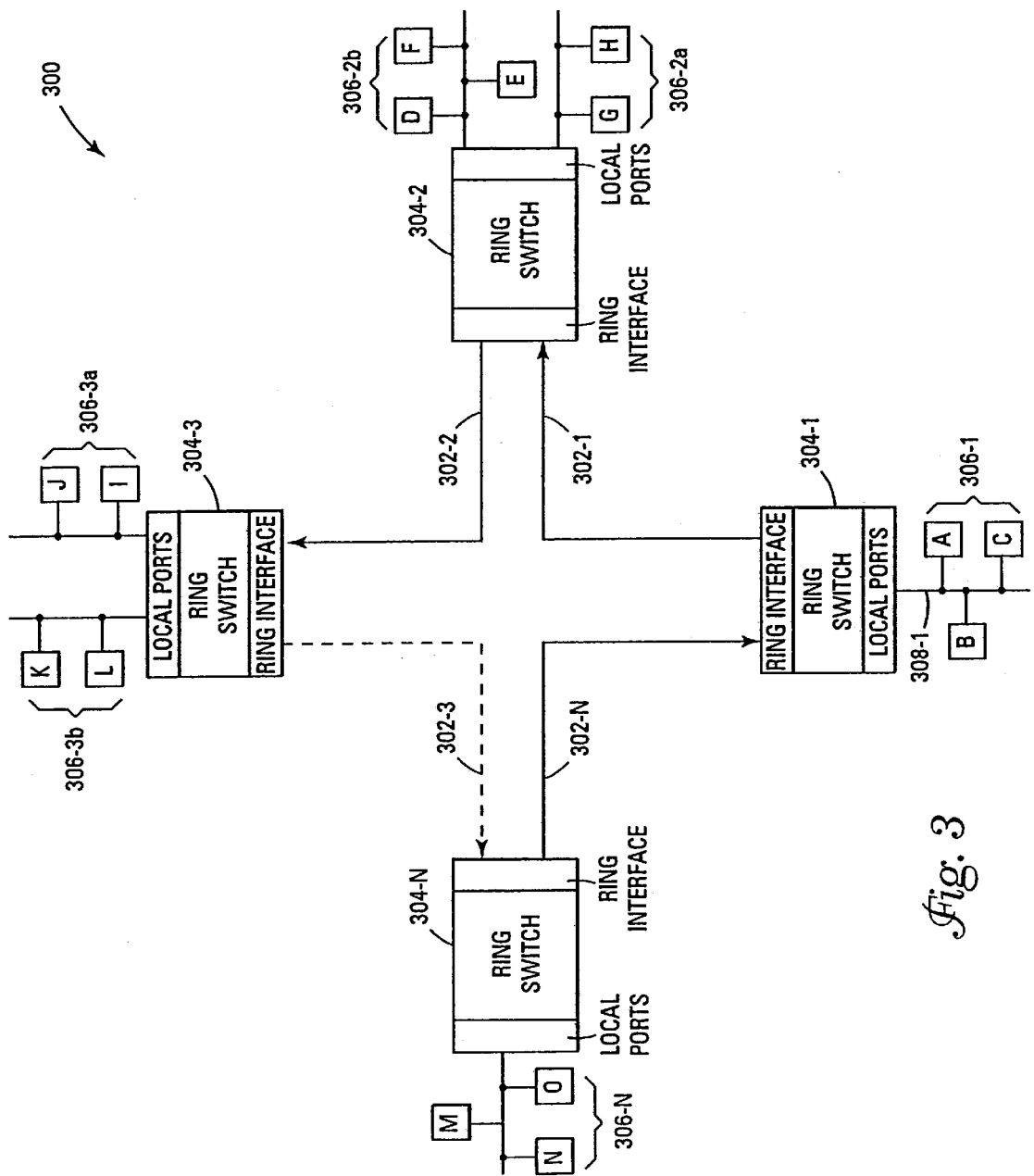
FIG. 3 is a block diagram of an embodiment of a ring network according to the teaching of the present invention.

FIG. 3 is a block diagram of an embodiment of a system, indicated generally at 300, for transmitting data packets in a unidirectional ring network. For purposes of this specification, the term data packets includes Ethernet, Token Ring, FDDI, Asynchronous Transfer Mode ("ATM") and other data packets with a format that includes at least a source address, a destination address, payload data, and, optionally, an error correction code such as a cyclical redundancy check.

For purposes of this specification, the terms "source address" and "destination address" include but are not limited to Media Access Control (MAC) addresses which are typically 48 bit hardware addresses programmed into a network device, e.g., an Ethernet MAC address. Alternatively, other addresses or signals can be used in place of the MAC addresses. For example, Internet Protocol (IP) addresses can be used for the source and destination addresses in switching a packet. An IP packet typically includes source and destination addresses that may be distinct from MAC addresses. Each IP address is a 32 bit number in a header of the IP packet. Further, port numbers in a Universal Datagram Protocol (UDP) header can also be used to determine where to switch a packet in a network element.

The hierarchical structure of the sub-networks in networks such as the Internet also provide a basis for switching packets. For example, Internet addresses are defined in terms of subnets. Such addresses are in the form of X.Y.Z.W with X typically identifying the class A network, X.Y typically identifying the Class B subnet, X.Y.Z typically identifying the class C subnet and W typically identifying the address of the device on the subnet. With addresses of this structure, the source identifier and the destination identifier for switching devices may include just a portion of the hierarchical address. For example, switching decisions could be made on only the first 3, 8, 10 or 16 bits, or any other portion of the hierarchical address.

It is further understood that the terms "source address" and "destination address" also include any combination of the various addresses or identifiers described above. For example, the elements of a network can make switching decisions based on both MAC addresses and IP addresses and portions of addresses. Other combinations of various identifiers can also be used.

Essentially, the terms source address and destination address include any data or signals that can be used to identify the source or destination of a packet transmitted over a ring network. Thus, the terms "address" and "identifier" are used interchangeably herein to include any data, signal or other indication that identifies a source or destination of a data packet. Moreover, the source and destination may apply to a final or intermediate source or destination.

Further, the term "Ethernet" includes the entire class of Carrier Sense Multiple Access/Collision Detection (CSMA/CD) protocols covered by the family of computer industry standards known variously as IEEE-802.3 and ISO 8802/3. This includes but is not limited to I-megabit Ethernet, known as "StarLAN", 10-megabit Ethernet, 100-Megabit Ethernet, known as "Fast Ethernet", 1-gigabit Ethernet, known as "Gigabit Ethernet" and any future CSMA/CD protocols at any other data rates. Advantageously, system 300 allows conventional data packets to be transmitted in a unidirectional ring network without the substantial complications involved with encapsulation and token protocols used in conventional ring networks. System 300 operates on data packets independent of the data rate and particular data packet protocol used. System 300 also overcomes the problems identified above with respect to trying to use conventional Ethernet switches, hubs or other devices in the ring network.

System 300 includes a number of ring switches 304-1 through 304-N that each self-learn which network devices are associated with the various ports of the ring switch. Each ring switch includes one or more local ports which are coupled to local networks. The local ports can include ports that are configured for use with Ethernet, Token Ring, ATM, FDDI or other appropriate network protocol. For example, ring switch 304-1 includes at least one local port that is coupled to local area network (LAN) 306-1. Local area network 306-1 includes network devices A, B, and C that are coupled to common bus 308-1. As used in this specification, the term "network devices" includes, but is not limited to, hubs, computer terminals and workstations, routers, switches, gateways and other devices that are conventionally coupled in a network.

It is noted that ring switch 304-2 has two local area networks, 306-2*a* and 306-2*b*, coupled to its local ports. This illustrates that the ring switches can support multiple local area networks, which may be substantially more than two.

Ring switches 304-1 through 304-N are coupled together by a transmission medium that interconnects the ring interfaces of the ring switches to form the ring of system 300. As shown in the embodiment of FIG. 1, ring switches 304-1 through 304-N are coupled in a ring by wires 302-1 through 302-N. Wires 302-1 through 302-N may comprise, for example, twisted pair wires, coaxial cable, a conductor on a printed circuit board, an internal connection between subsections of a single integrated circuit, fiber optic cable, wireless connection, or other appropriate medium for transmitting data packets between the ring switches in system 300. In this way, system 300 could be used as a low cost way to increase the number of available local ports of a conventional Ethernet switch.

Figure 13:
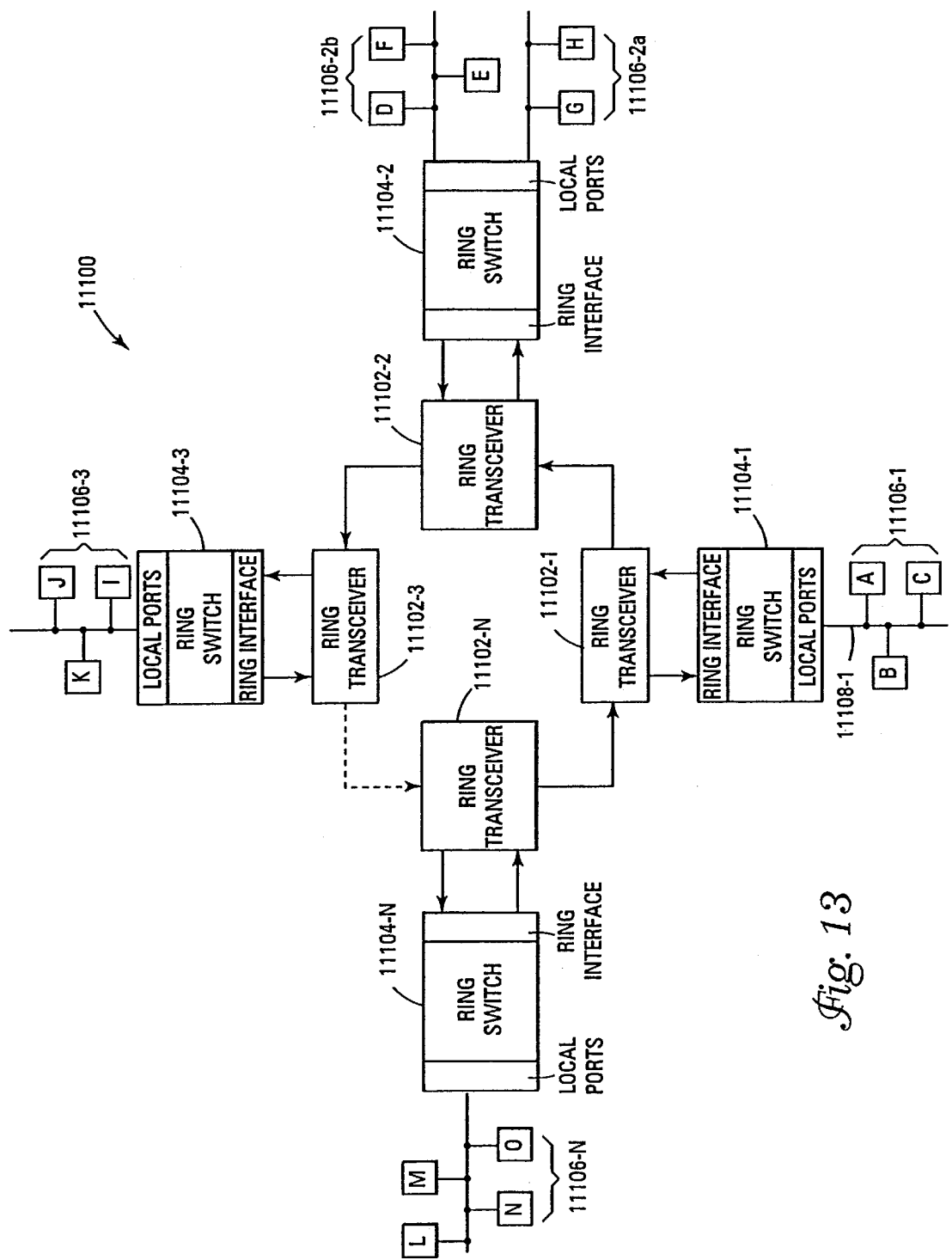
FIG. 13 is a block diagram of another embodiment of a ring network according to the teachings of the present invention.

In an alternative embodiment shown in FIG. 13, ring transceivers 11102-1 through 11102-N are coupled to form a unidirectional ring for transmitting Ethernet packets between ring switches of system 11100. Ring switch 11104-1 through 11104-N are associated with ring transceivers 11102-1 through 11102-N, respectively. Ring transceivers 11102-1 through 11102-N may comprise, for example, a number of DV6000 fiber transport systems available from ADC Telecommunications of Minnetonka, Minnesota. The DV6000 provides 16 channels of capacity for transporting data. In this embodiment, only one channel of the DV6000 is used to transmit the Ethernet packets in system 11100. The other channels may be used for additional ring switch networks or other purposes, e.g., video, voice or other data transmission. Alternatively, ring transceivers 11102-1 through 11102-N may be implemented with other conventional transport mechanisms such as, for example, wireless transceivers, fiber optic transceivers, etc.

Advantageously, ring switches 304-1 through 304-N of system 300 use a method that prevents packets from being transmitted around the ring network indefinitely. According to one embodiment, a ring switch reads the source address of packets as they enter the ring interface for the ring switch. If the source address of the packet received at the ring interface corresponds to the address of a network device associated with the local ports of the ring switch, the method removes the packet from the ring and discards it. This means that a packet that originated from a network device associated with the local ports (e.g., network device A, B, or C for ring switch 304-1) has passed completely around the ring of system 300 and arrived back at the ring-in port of the originating ring switch. This method allows a ring switch to remove a packet because the destination address for the packet originating from a network device associated with one of its local ports was not found in system 300.

In another embodiment, an identification number for each switch is used to prevent packets from indefinitely circling the ring network. When a packet enters a ring switch from a local port, an identification number for the ring switch is appended, pre-pended or added to the packet. When packets are received at the ring interface of a ring switch, the ring switch looks at the identification number for the packet. If the identification number indicates that the packet originated from this ring switch, then the packet is removed from the system. In another embodiment, a counter is appended to the packet at its originating ring switch. Each subsequent ring switch in the network that processes the packet increments the counter for the packet. Further, each ring switch that processes the packet checks the value of the counter. If the value of the counter exceeds an assigned threshold, then the packet is removed. The maximum value for the counter is selected so that the packet is removed from the ring when it has circled the network at least once.

Ring switches 304-1 through 304-N also use a modified method for processing data packets at the ring interface that allows proper processing of packets without loss of data. In one embodiment, the ring interface for each ring switch includes two ports: a ring-in port and a ring-out port. Basically, the ring switch builds an address table for the ring-out port based on the source addresses for packets received at the ring-in port. This is so that packets destined for network devices associated with local ports of other ring switches in system 300 will go out of the ring-out port and travel around the ring and be switched to a local port of the appropriate ring switch. In this manner, the ring switch learns that all network devices in system 300 that are not associated with local ports of the switch can be reached only through the ring-out port and not through the ring-in port. It is noted that in each of these embodiments, the ring switch may maintain either multiple address tables or a single address table for all of the ports of the ring switch or a separate table for each of the ports. In the case with a single address table and possibly in the case of multiple address tables, the ring switch uses a number of bits associated with each address in the table to indicate the port associated with the address.

Figure 5:
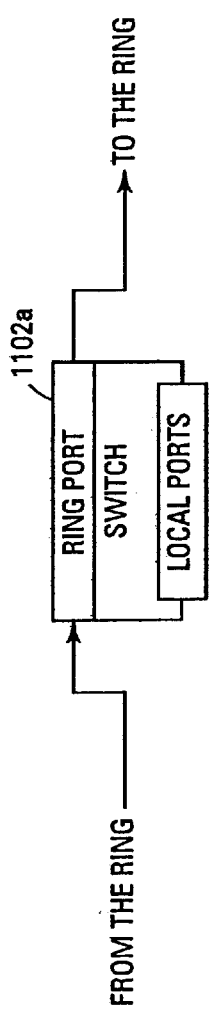
FIG. 5 is a block diagram of a ring switch according to the teachings of the present invention.

In another embodiment, the ring interface of each ring switch includes a single bidirectional ring port as shown in FIG. 5. To eliminate the problem of lost data, in this embodiment, the method uses normal address tables and address learning techniques, but allows packets received at the ring port also to be transmitted out the ring port in violation of the conventional rule for Ethernet switches that a packet cannot be switched out on the port from which it was received. In this embodiment, the rule of Destination Address Filtering is also suspended so that packets originating from a prior ring switch on the ring, and destined for a subsequent ring switch on the ring, can be received by intermediate switches.

A variety of services can be provided over network 300 by prepending, including or postpending identifiers or "tags" to packets transported by the network. For example, services such as virtual local area networks (VLANs), quality of service (QOS) and other services can be implemented through the use of such tags.

Network 300 could implement a VLAN using tags as follows. Multiple Local Area Networks (LANs) can be coupled to the local ports of a ring switch as shown, for example, in ring switches 304-2 and 304-3 of FIG. 3. Certain types of packets, such as broadcast or multicast packets, that are switched off from the ring to a local port may be transmitted on all local ports of the ring switch that drops the traffic from the ring. This creates a security problem because one organization or device could receive data that is destined for other organizations or devices. In some circumstances, two or more LANs that belong to different organizations, e.g., one organization leases access to the ring switch from another organization, may be coupled to local ports of the same switch. Advantageously, in one embodiment, network 300 includes virtual LAN identifiers (VLANs) that are prepended, postpended, or included in packets to distinguish the packets for LANs that are on local ports of the same or different switches. For example, LAN 306-2*a* and 306-3*a* are associated LANs. When a packet is received at the local ports of ring switch 304-2 from network device G or H, a VLAN identifier is prepended, postpended, or included in the packets based on the local port that received the packet. When the packets are switched off the ring, ring switch 304-3 looks at the prepended VLAN identifier to determine which local port or ports are allowed for the packets. In this example, the ring switch would transmit any and all packets with the appropriate VLAN identifier out the local port for LAN 306-3*a*.

The VLAN identifier is stripped off the packet before transmission out the local port to prevent users from gaining access to the signaling used by the switches to implement the VLAN. This provides an added layer of security to the users of the VLAN. Thus, even if the packet is a broadcast or multicast packet, it will not go out all ports. Rather, the packet will only be switched out ports that are designated as members of the VLAN.

In another embodiment, a virtual local area network can be created based on a table of identifiers, e.g., MAC addresses, IP addresses, or other appropriate identifiers, for network devices that are part of the VLAN. For example, network devices H, 1, and K are associated on a virtual LAN. When packets are received at the local ports of ring switch 304-2 from network device H that are destined for network device K, a VLAN identifier is prepended, postpended, or included in the packets based on a table of identifiers that identify the devices that are members of the VLAN. When the packets are switched off the ring, ring switch 304-3 looks at the prepended, postpended, or included VLAN identifier and a table of identifiers to determine which local devices are members of the VLAN as identified by the VLAN identifier. In this example, the ring switch would transmit any and all packets from network device H with the appropriate VLAN identifier out the local port for LAN 306-3b to device K.

The VLAN identifier is stripped off the packet before transmission out the local port to prevent users from gaining access to the signaling used by the switches to implement the VLAN. This provides an added layer of security to the users of the VLAN. Thus, even if the packet is a broadcast or multicast packet, it will not go out all ports. Rather, the packet will only be switched out ports with network devices that are designated as members of the VLAN.

In other embodiments, a combination of network devices and local ports can be identified to establish a virtual local area network.

The VLAN identifiers can also be used to implement a multicasting function in network 300. Although FIG. 3 illustrates a number of LANs that are interconnected by the ring of ring switches, the local ports could be coupled, instead, to cable networks that provide signals, e.g., video data, to subscribers of a video program or a video-conference. In this embodiment, the VLAN identifier is used to direct packets to a specified group of users. For example, network devices G, H, J, C, and B are in a group that is receiving, for example packets from a source associated with ring switch 304-N, e.g., a head end of a cable system that is providing pay per view service to the identified devices. When packets are received at ring switch 304-N, the ring switch looks in a table that indicates a VLAN identifier that is associated with, for example, a MAC or IP address of the packets. This address is, for example, an Ethernet multicast address, IP multicast address or other appropriate multicast address. The VLAN identifier is prepended, postpended, or included in the packets and they are transmitted around the ring.

At each ring switch, the multicast address indicates that the packet is a VLAN packet such that the ring switch looks for the prepended, postpended or included VLAN identifier. For example, ring switch 304-2 looks in its table and determines that the VLAN identifier is associated with network devices G and H based on, for example, MAC addresses or IP addresses in the table that are associated with the VLAN identifier. Ring switch 304-2 thus sends out packets on the local port that includes network devices G and H. The packets include a multicast address that is decoded by the network devices. Alternatively, ring switch 304-2 could generate copies of the packet and insert the Ethernet and/or IP address of each of the network devices that are to receive the packets.

The description of the Figures that follow are described in terms of processing packets without specific reference to the use of tags such as VLAN identifiers. It is understood, however, that the processing and systems described herein apply in the tagging context as well by describing processing that occurs within a tagging system. In particular, for example, all references to "broadcast packets", or to the "broadcast"of a packet means that the packet will be broadcast only to devices associated with the same VLAN identifier. Similarly, for example, all references to switching a packet off the ring to a particular device mean that the packet will be switched off the ring, based on the device identifiers, but will not be transmitted on the local ports of the ring switch unless the device that sent the packet (as determined by the source identifier) and the intended recipient (as determined by the destination identifier) are members of the same VLAN.

Figure 4:
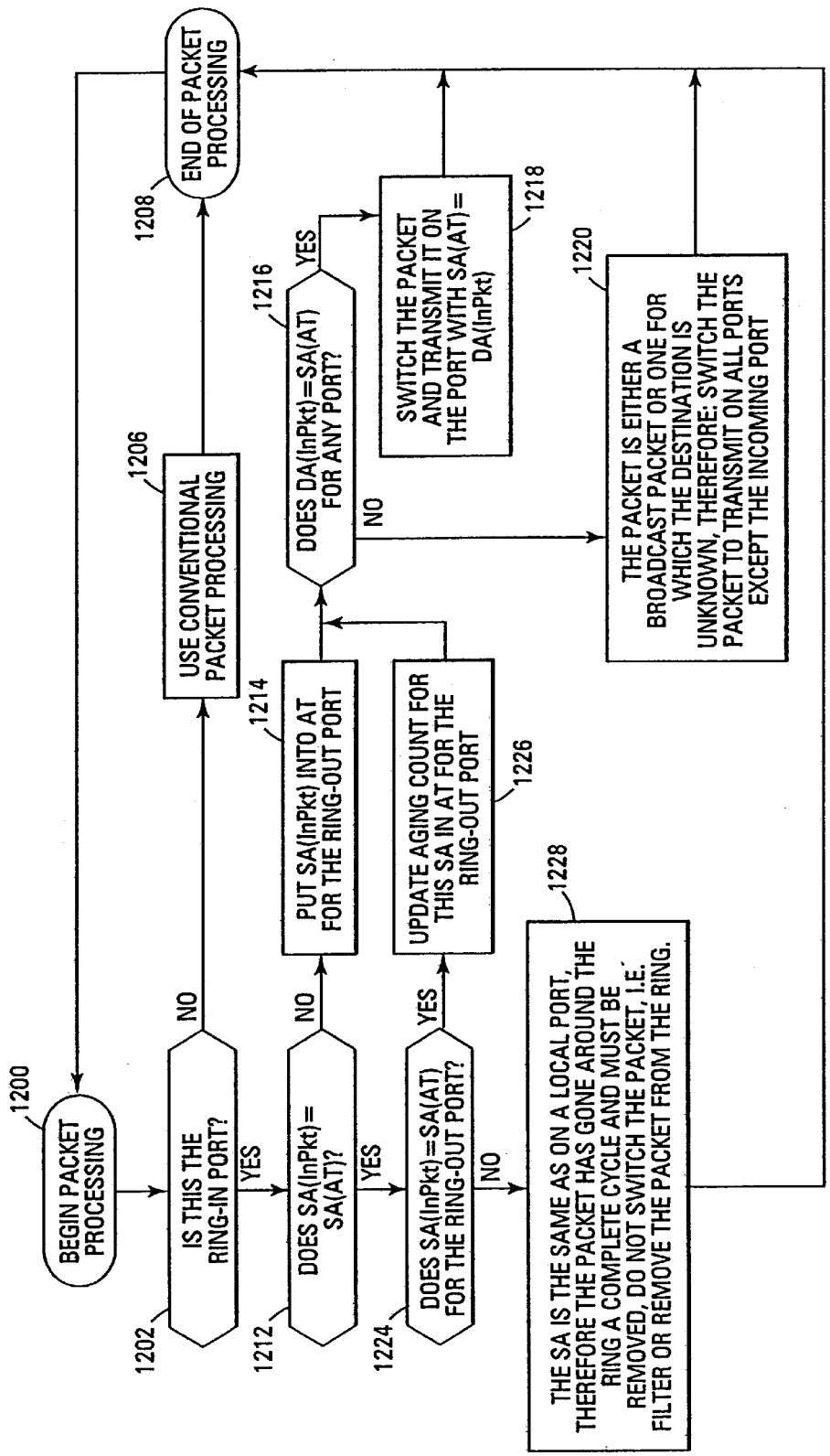
FIG. 4 is a flow chart for an embodiment of a method for processing data packets in a ring network according to the teachings of the present invention.

FIG. 4 is a flow chart that illustrates a first embodiment of a method for processing data packets in a ring network according to the teachings of the present invention. This method implements the technique of creating an address table for a ring- out port of a ring switch based on the source address of data packets received at a ring-in port. The method also checks the source address of incoming packets against address tables for the one or more local ports of the Ethernet switch to remove packets originating from the local ports that have traveled around the ring network. The following table provides definitions for the abbreviations used in FIGS. 4 and 6.

| Abbreviation | Definition |
| --- | --- |
| DA | Destination Address |
| SA | Source Address |
| AT | Address Table |
| SA(AT) | Source Address in the Address Table |
| SA(InPkt) | Source Address in the data packet being processed |
| DA(InPkt) | Destination Address in the packet being processed |

The method begins processing an incoming data packet at block 1200. The first factor used by the method is to determine which kind of port has received the data packet. The method processes the data packets differently based on whether the incoming data packet is received at the ring-in port or a local port. Thus, at block 1202, the method determines whether the switch received the incoming data packet at the ring-in port. If the data packet is received at a local port, the method proceeds to block 1206 and uses conventional switching techniques to process the data packet. The method then ends the processing of the data packet at block 1208.

If the data packet was received at the ring-in port, the method proceeds from block 1202 to block 1212 and uses modified techniques to address the problems identified above with respect to processing data packets in a ring network. The method first determines whether the switch has handled data packets for this network device before. The method does this by looking for the source address of the incoming data packet in the at least one address table or tables for the ports of the ring switch. If the source address is not in one of the address tables, the method proceeds to block 1214 and places the source address for the incoming data packet into the table for the ring-out port even though the data packet was received at the ring-in port. This way, future data packets processed by the ring switch that are destined for the network device that originated the data packet will be transmitted out onto the ring network at the ring-out port to be switched out to the network device at the local port of its ring switch.

The method next turns to determining where to switch this data packet. At block 1216, the method determines whether the destination address of the incoming data packet is in the address tables for any port of the ring switch. If the destination address is in one of the at least one address tables, the method switches the data packet from the ring-in port to the port indicated in the address table. The method then ends the processing of this data packet at block 1208.

At block 1216, if the destination address for the data packet is not in the address table for one of the ports of the ring switch, the method broadcasts the data packet on all ports except the ring-in port. The method ends the processing of this data packet at block 1208.

If at block 1212, the method determines that the source address is known to the ring switch, the method proceeds to block 1224. At block 1224, the method determines whether the source address for the incoming data packet is in the address table for the ring-out port. If so, the method proceeds to block 1226 and updates the aging count for the source address in the address table for the ring-out port. The method proceeds on to block 1216 to finish processing the data packet as described above.

If at block 1224, the method determines that the incoming data packet is not from a network device associated with the ring-out port, then the method proceeds to block 1228 and filters out, truncates or otherwise eliminates the data packet. In this case, it is determined that the source address is an address table for a local port. This means that the data packet originated with a network device that is associated with a local port of this ring switch and has traveled around the ring network without being switched out to the network device designated by the destination address of the incoming data packet. Thus, the incoming data packet is either improperly addressed, a broadcast packet, or a multicast packet, and should be removed from the network.

Figure 6:
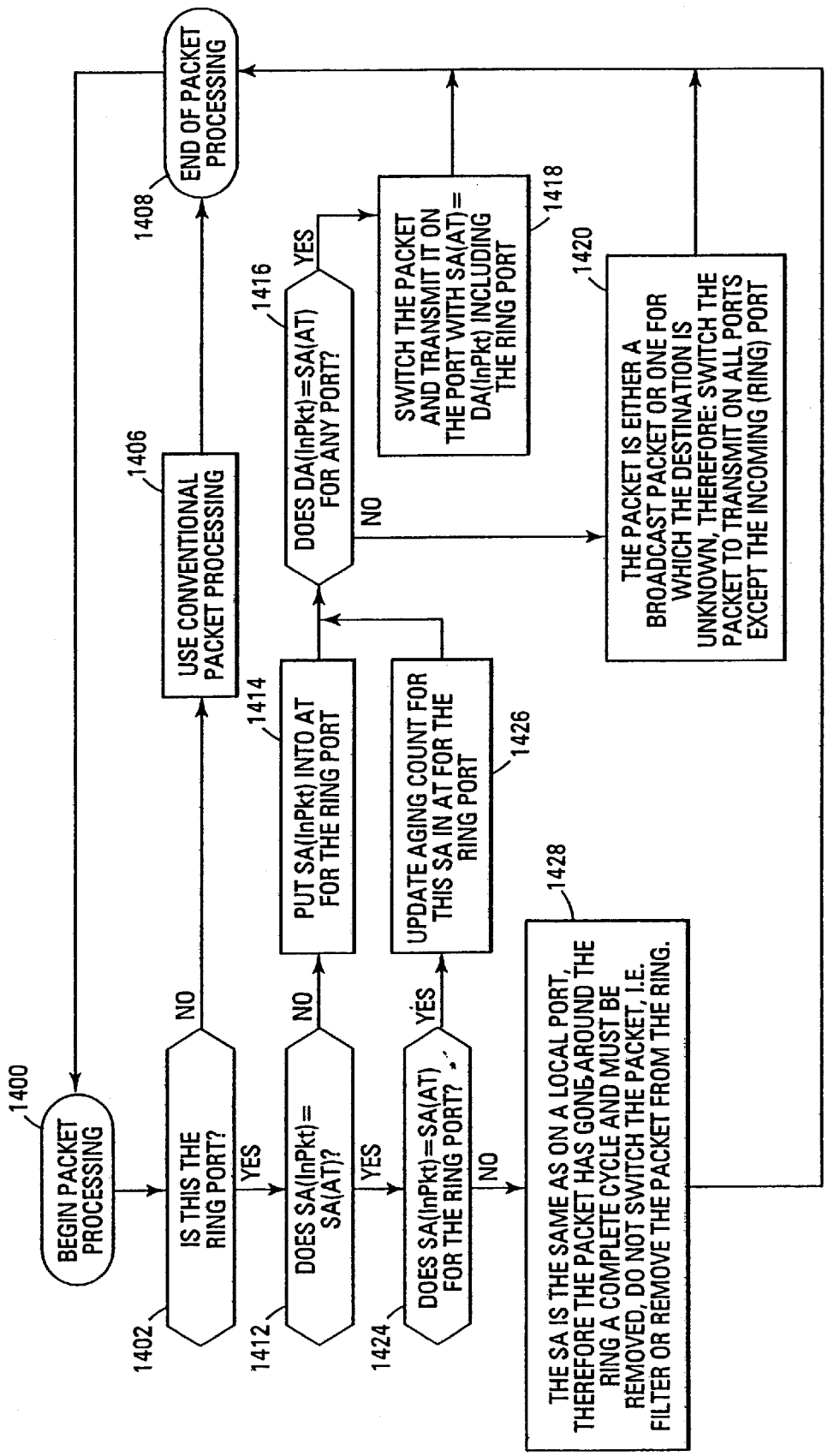
FIG. 6 is a flow chart that illustrates another embodiment of a method for processing data packets in a ring network according to the teachings of the present invention.

FIG. 6 is a flow chart that illustrates another embodiment of a method for processing data packets in a ring network according to the teachings of the present invention. This method implements the technique of using conventional self-learning functions, such as the type of self-learning used in conventional Ethernet switches, but allowing data packets to be transmit out from the ring port even when the data packet was received at the ring port to prevent loss of data. Thus, this method violates conventional rules of Ethernet packet processing that are used in every other known existing type of Ethernet device, and in particular the rules used in Ethernet switching. The method also checks the source address of incoming data packets against address tables for the one or more local ports of the ring switch to remove data packets originating from the local ports that have traveled around the ring network.

The method begins processing an incoming data packet at block 1400. The first factor used by the method is to determine which kind of port received the incoming data packet. The method processes the data packets differently based on whether the incoming data packet is received at the ring port or at a local port. Thus, at block 1402, the method determines whether the switch received the incoming data packet at the ring port. If the data packet is received at a local port, the method proceeds to block 1406 and uses conventional switching techniques to process the data packet. The method then ends the processing of the data packet at block 1408.

If the data packet was received at the ring port, the method proceeds from block 1402 to block 1412 and uses modified techniques to address the problems identified above with respect to processing data packets in a ring network. The method first determines whether the ring switch has handled data packets for this network device before. The method does this by looking for the source address of the incoming data packet in the address table for the ports of the ring switch. If the source address is not in the address table associated with one of the ports, the method proceeds to block 1414 and places the source address for the incoming data packet into the table for the ring port as would be done in conventional Ethernet practices.

The method next turns to determining where to switch this data packet. At block 1416, the method determines whether the destination address of the incoming data packet is in the address table for one of the ports of the ring switch. If the destination address is in the table for one of the ports, the method switches the data packet at block 1418 from the ring port to the port with the address table that contains the destination address even if the destination address is in the table for the ring port. This violates conventional Ethernet rules but, in this case, advantageously allows ring switches to be configured in a ring network. The method then ends the processing of this data packet at block 1408.

At block 1416, if the destination address for the data packet is not in the address table for one of the ports of the ring switch, the method broadcasts the data packet on all ports including the ring port at block 1420. The method ends the processing of this data packet at block 1408.

If at block 1412, the method determines that the source address is known to the ring switch, the method proceeds to block 1424. At block 1424, the method determines whether the source address for the incoming data packet is in the address table for the ring port. If so, the method proceeds to block 1426 and updates the aging count for the source address in the address table for the ring port. The method proceeds on to block 1416 to finish processing the data packet as described above.

If at block 1424, the method determines that the incoming data packet is not from a network device associated with the ring port, then the method proceeds to block 1428 and filters out, truncates or otherwise eliminates the data packet. In this case, it is determined that the source address is an address table for a local port. This means that the data packet originated with a network device that is associated with a local port of this ring switch and has traveled around the ring network without being switched out to the network device designated by the destination address of the incoming data packet. Thus, the incoming data packet is improperly addressed, a broadcast packet, or a multicast packet, and should be removed from the network.

Figure 7:
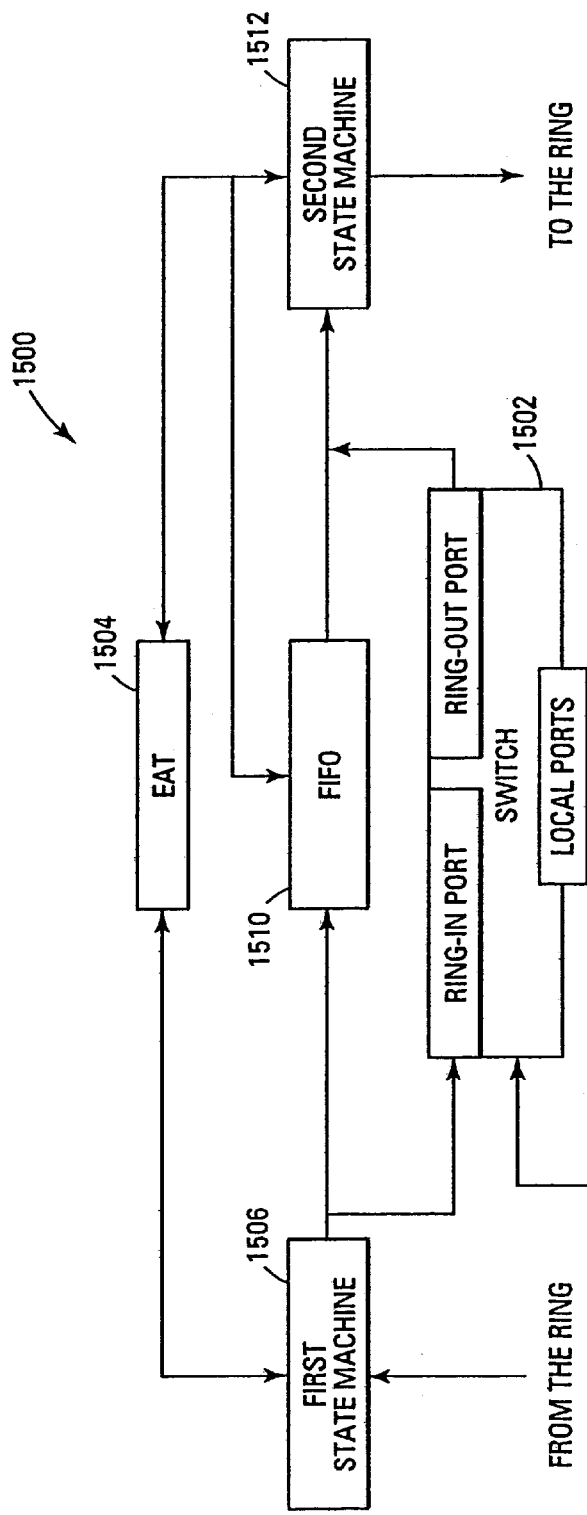
FIG. 7 is a block diagram of an embodiment of a modified Ethernet switch according to the teachings of the present invention.

FIG. 7 is a block diagram of an alternative embodiment of a ring switch, indicated generally at 1500, for a ring network according to the teachings of the present invention. In this embodiment, external circuitry is used with conventional Ethernet switch 1502 to implement methods to prevent data packets from being inadvertently dropped from the network and to filter out data packets that have traveled around the ring network without being switched out to a local port of one of the ring switches. In this embodiment, switch 1502 is a Thunderswitch by Texas Instruments of Richardson, Texas, part no. TNETX3150 or a GT-48002 or GT-48002A Fast Ethernet Switch Controller by Galileo Technology of Karmiel, Israel. The Thunderswitch and Galileo switches are examples of Ethernet switches that have an interface port that enables those switching chips to be forced, or manipulated, via an external processor to suspend their conventional automatic address table self learning algorithms and allow the external processor to place addresses in the address table. In this embodiment, the external processor reads the source addresses that come in from the ring and writes those addresses in the address table with the port identification bits set, by the external processor, to the port identification bits for the ring-out port. Alternatively, switch 1502 may comprise a conventional PM33351 FastEtherDirector Ethernet switch from PMC-Sierra, Inc. of Burnaby, BC, Canada. With this embodiment, the PM3351 switch can be reprogrammed so as to disable the Destination Address Filtering function for a port so as to allow data packets to be transmitted out the same port from which the data packets arrived. In this embodiment, switch 1502 would have a single ring port such as shown in FIG. 5. Other conventional Ethernet switches that can be reprogrammed can be substituted in place of the Thunderswitch, Galileo and PMC-Sierra switches. The use of a reprogrammed Thunderswitch, Galileo, PMC-Sierra switch or their equivalents solves one of the problems with conventional ring switches in a ring network; namely loss of data packets due to the ring nature of the network. The additional circuitry shown in FIG. 7 is used to implement the source address filtering function that prevents data packets from being transmitted around the network indefinitely. This circuitry in FIG. 7 is shown with switch 1502 having ring-in and ring-out ports. It is understood that the external circuitry works equally well with a switch with a bidirectional ring-port.

Basically the external circuitry of ring switch 1500 is used to deduce the addresses from incoming data packets that correspond to network devices associated with the local ports of switch 1502 based on the stream of data packets coming into the ring-in port and out of the ring-out port. These addresses are placed in external address table (EAT) 1504 of ring switch 1500. Incoming data packets are compared against this address table to determine which data packets have traveled full circle around the ring and need to be dropped.

There are four basic scenarios for data packets processed by ring switch 1500:

1. A data packet comes from the ring network into the ring-in port and does not come out the ring-out port. The destination address for this data packet corresponds to a network device on a local port and will be placed in external address table 1504.

2. A data packet comes from a local port and is switched out the ring-out port of switch 1502 to be placed onto the ring network. This data packet will only be in the outgoing data packet stream and thus its source address can be added to external address table 1504.

3. A data packet comes from the ring and goes into switch 1502 at the ring-in port and is transmitted back out onto the ring network at the ring-out port. The addresses of this data packet are not associated with a local port.

4. A data packet comes from the ring and its source address is the same as the source address for a local port and needs to be filtered out since it has traveled full circle around the ring network.

Switch 1500 includes two state machines that receive data from the ring-in and the ring-out ports of switch 1502 that can distinguish between each of these scenarios by generating and looking in external address table 1504. First state machine 1506 is coupled to receive data packets from the ring. First state machine 1506 provides source addresses from incoming data packets to first-in, first-out (FIFO) buffer 1510. Second state machine 1512 uses the data in FIFO 1510 and the data packets transmitted out the ring-out port to determine which addresses correspond to the local ports. Second state machine 1512 places these address in, and maintains external address table 1504.

Figure 9:
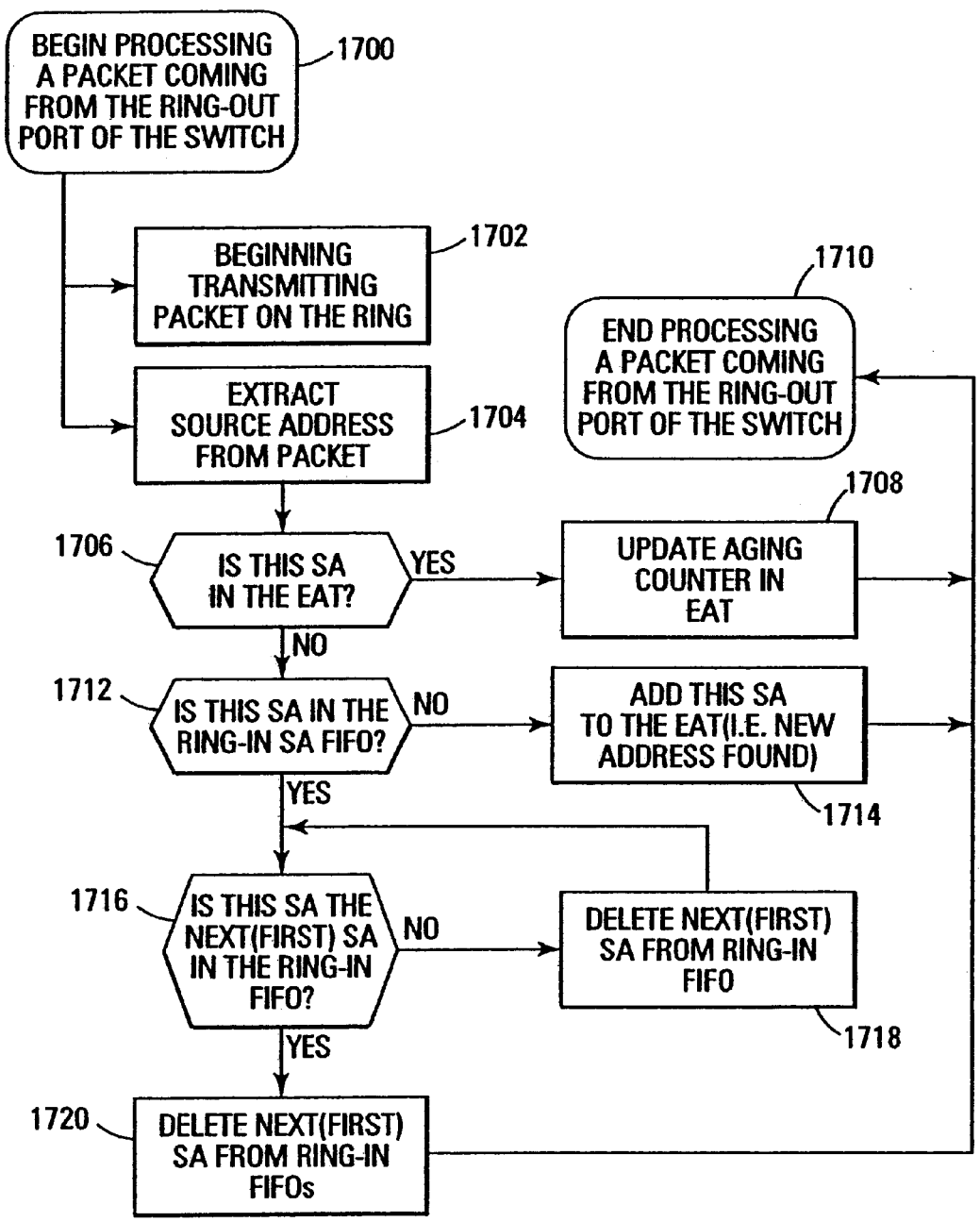
FIG. 9 is a flow chart that illustrates an embodiment of a method for learning the addresses of terminals associated with local ports of an Ethernet switch according to the teachings of the present invention.

FIG. 9 is a flow chart that illustrates an embodiment of a method for second state machine 1512 of FIG. 7. This state machine is used to build and maintain the external address table for the network devices associated with the local ports of switch 1502. The method begins at block 1700. At block 1702, the method begins transmitting a data packet onto the ring from the ring-out port of switch 1502. At block 1704, the method extracts the source address from the data packet. At block 1706, the method determines whether the source address for the data packet is in EAT 1504. If the source address is in EAT 1504, the method proceeds to block 1708 and updates an aging counter in EAT 1504 and allows the data packet to be completely transmitted without interruption. The method then proceeds to block 1710 and ends the processing of the data packet coming out of the ring-out port.

At block 1706, if the method determines that the source address of the data packet coming out of the ring-out port is not in EAT 1504, the method proceeds to block 1712. At block 1712, the method determines whether the source address taken from the data packet at the ring-out port is in FIFO 1510. If not, the method proceeds to block 1714 and adds the source address taken from the data packet at the ring-out port to EAT 1504. This corresponds to the case of a data packet that originated with a network device associated with a local port of switch 1502, i.e., the data packet came out of the ring-out port without entering the ring-in port. The method proceeds to block 1710.

At block 1712, if the method determines that the source address for the data packet is in FIFO 1510 then the method proceeds to block 1716. At block 1716, the method determines whether the source address is the next source address to be taken out of FIFO 1510. If the source address is not the next address in FIFO 1510, then we know that at least one data packet terminated at a local address. Thus, the method proceeds to block 1718 and deletes the next address from FIFO 1510 and returns to block 1716.

If at block 1716, it is determined that the source address is the next address in FIFO 1510, then the method proceeds to block 1720 and deletes the next address from FIFO 1510. This corresponds to the case where a data packet was passed through switch 1502 from the ring-in port to the ring-out port.

Thus, according to this method, an address table that corresponds to the address tables for the local ports of switch 1502 is maintained external to switch 1502 so that data packets that have traveled around the ring network can be identified and filtered.

The same technique can be used with a switch identification number and hop counter. In this case the processing is the same. The FIFO will however be wider to accommodate in each logical location a series of bits that contain one or all of the source address, the switch identification number and the hop counter. If a hop counter is included it would be incremented by one at some point and tested as the first step upon being received from the ring.

Figure 8:
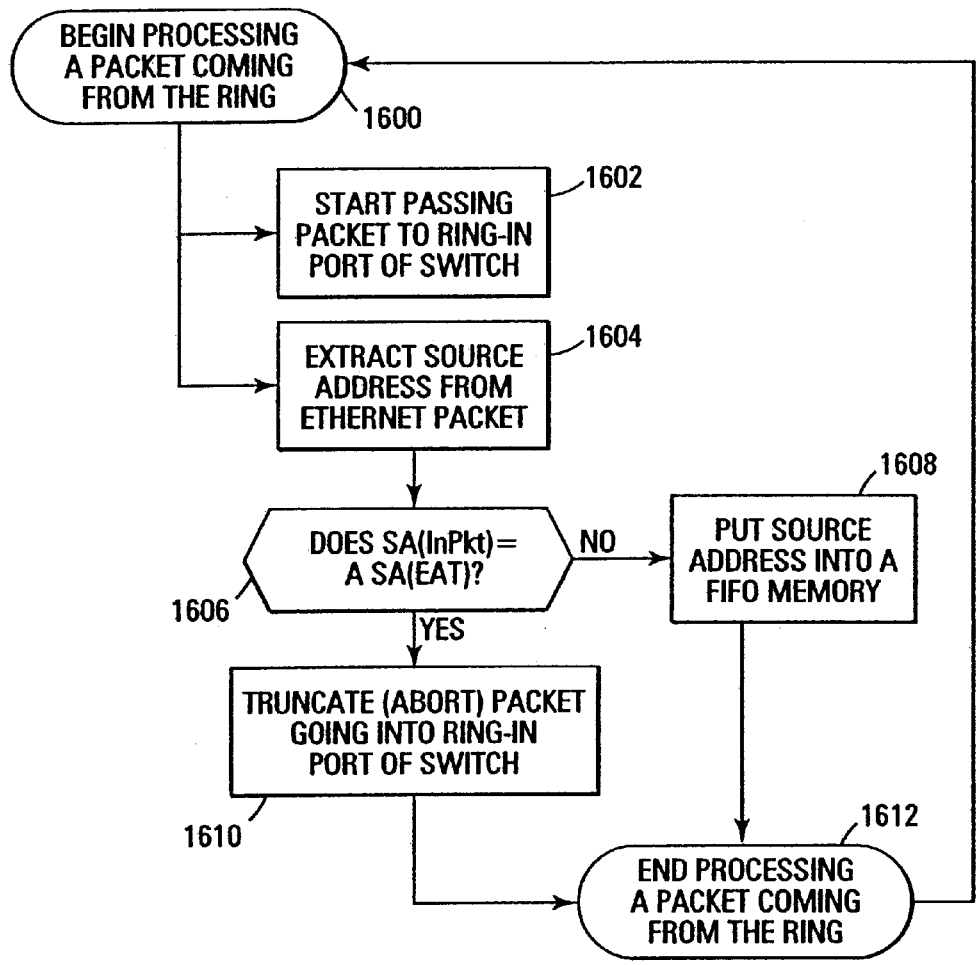
FIG. 8 is a flow chart that illustrates an embodiment of a method for identifying packets with invalid destination addresses according to the teachings of the present invention.

FIG. 8 is a flow chart of an illustrative embodiment of a method for first state machine 1506 of FIG. 7 according to the teachings of the present invention. This state machine is used to determine when a source address of a data packet at the ring-in port of switch 1502 corresponds to a network device associated with a local port of switch 1502. The method begins at block 1600. At block 1602, the method starts passing a data packet to the ring-in port of switch 1502. At block 1604, the method extracts a source address from the data packet. At block 1606, the method compares the source address of the incoming data packet with the addresses in EAT 1504. If there is no match in EAT 1504 for the source address of the data packet, the method proceeds to block 1608 and places the source address into FIFO 1510 and the entire data packet is transmitted into switch 1502 without interruption. The method then ends processing the data packet at block 1612 and returns to block 1600 to process the next data packet.

At block 1606, if the source address of the data packet is in EAT 1504, the method proceeds to block 1610 and truncates (aborts) the data packet going into the ring- in port of switch 1502. This prevents a data packet that originated from a local port of a switch from traveling indefinitely around the ring network.

Figure 10:
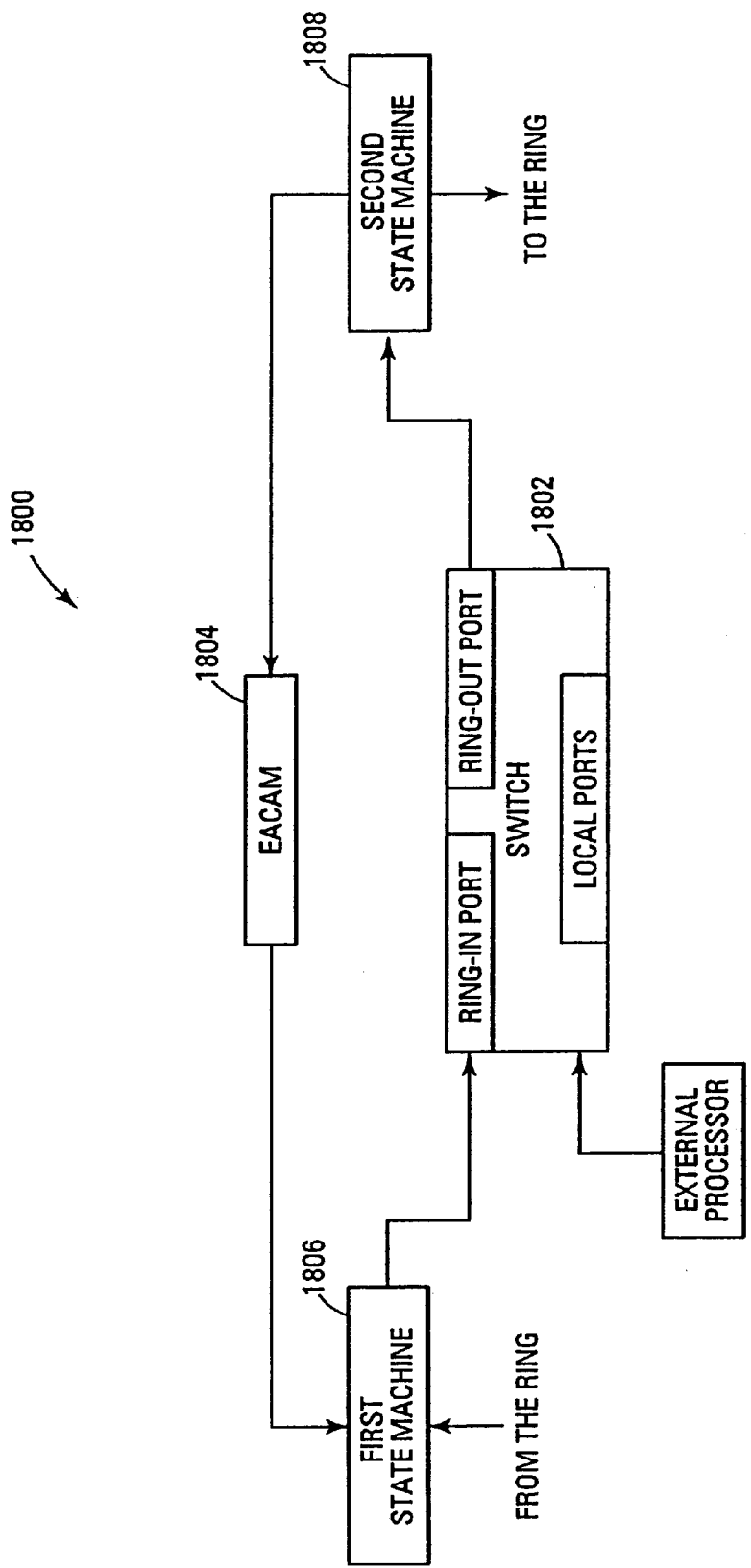
FIG. 10 is a block diagram of another embodiment of a modified Ethernet switch according to the teachings of the present invention.

FIG. 10 is a block diagram of an alternative embodiment of a ring switch, indicated generally at 1800, and constructed according to the teachings of the present invention. This embodiment takes advantage of the fact that a primary goal of this method is to catch data packets that originated at a local port and have come full circle around the ring network and arrived at the ring-in port of the same ring switch. It also takes advantage of the fact that data packets coming out of the ring-out port can only come from one of two sources: a local port or the ring-in port. By tracking and comparing the addresses for data packets exiting the ring-out port and the addresses of data packets entering the ring-in port in an external address table implemented most easily in one or more Content Addressable Memories, EACAM 1804, ring switch 1800 can determine whether the addresses correspond to a local port. To this end, ring switch 1800 includes switch 1802 that may comprise a reprogrammed Ethernet switch such as, for example, a Thunderswitch chip by Texas Instruments, Galileo chip or PMC-Sierra chip switch of the varieties described above with respect to FIG. 7. Ring switch 1800 includes first state machine 1806 that is coupled to receive the data packets destined for the ring-in port of switch 1802. Further, ring switch 1800 includes second state machine 1808 that is responsive to data packets from the ring-out port of switch 1802. First and second state machines 1806 and 1808 build and maintain a table in EACAM 1804 that indicates which ports are local ports so that first state machine 1806 can remove data packets from the ring network that originated with a local port of switch 1802 and traveled full circle around the ring network. The operation of first and second state machines 1806 and 1808 are described below with respect to FIGS. 11 and 12, respectively.

Figure 12:
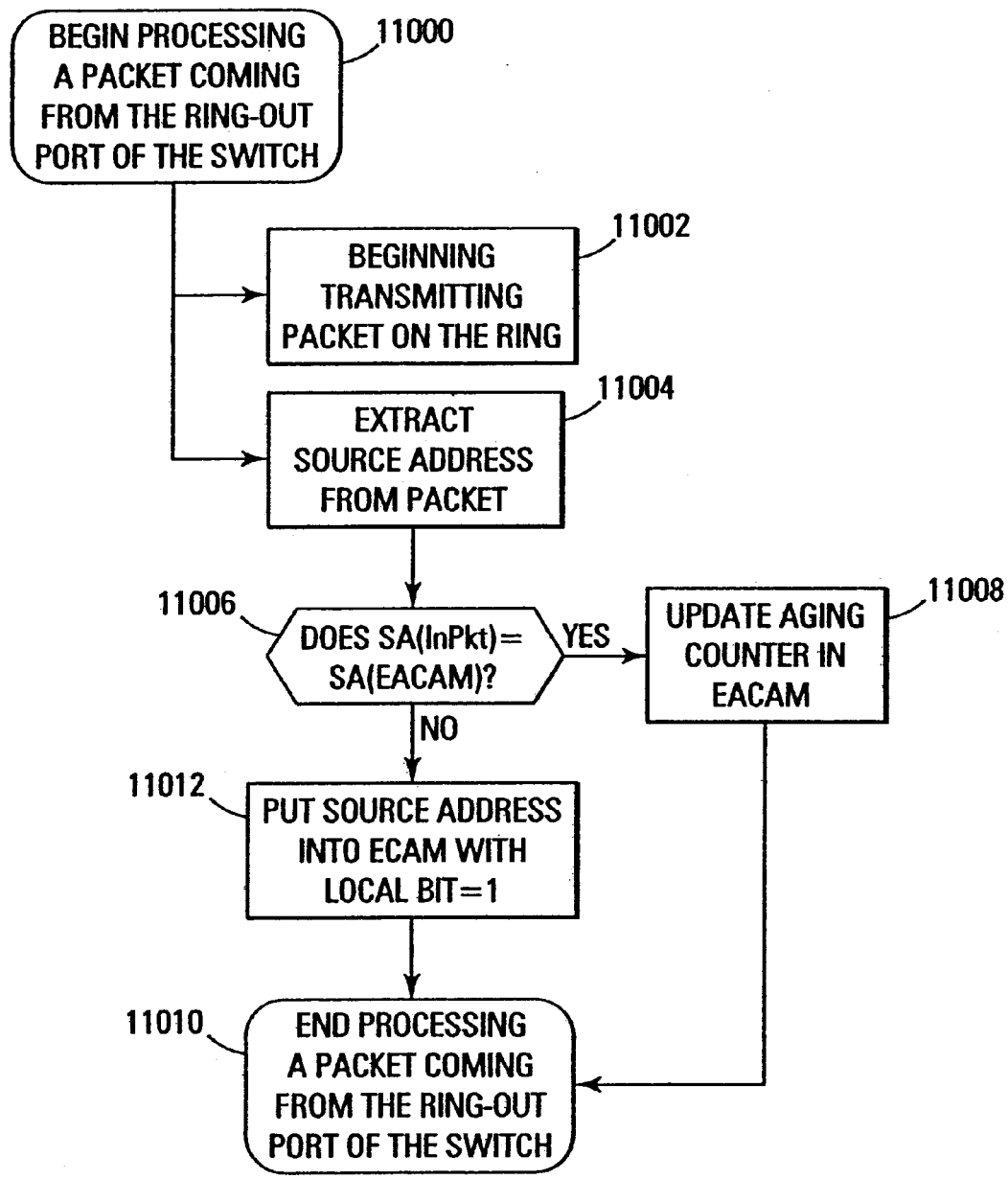
FIG. 12 is a flow chart that illustrates another embodiment of a method for learning the addresses of network devices associated with local ports of an Ethernet switch according to the teachings of the present invention.

FIG. 12 is a flow chart that illustrates one embodiment of a method for second state machine 1808 of FIG. 10 according to the teachings of the present invention. The method begins processing a data packet block 11000. The method proceeds to block 11002 and begins transmitting the data packet on the ring network. At block 11004, the method extracts a source address from the data packet.

At block 11006, the method determines whether the source address of the data packet from the ring-out port of switch 1802 is in the table of EACAM 1804. If the address has already been stored in EACAM 1804, the method proceeds to block 11008 and updates an aging counter in EACAM 1804 for the address and allows the data packet to be completely transmitted without interruption. The method terminates the processing of the data packet at block 11010.

If, at block 11006, the source address for the data packet is not in EACAM 1804, the method proceeds to block 11012. In this case, the method has determined that the data packet must have originated from a local port and thus the source address is placed in the table in EACAM 1804 with a local bit indicator set to "1". The "1" indicates that the address corresponds to an address for a network device that is associated with a local port of switch 1802. The method then proceeds to block 11010 and terminates.

Figure 11:
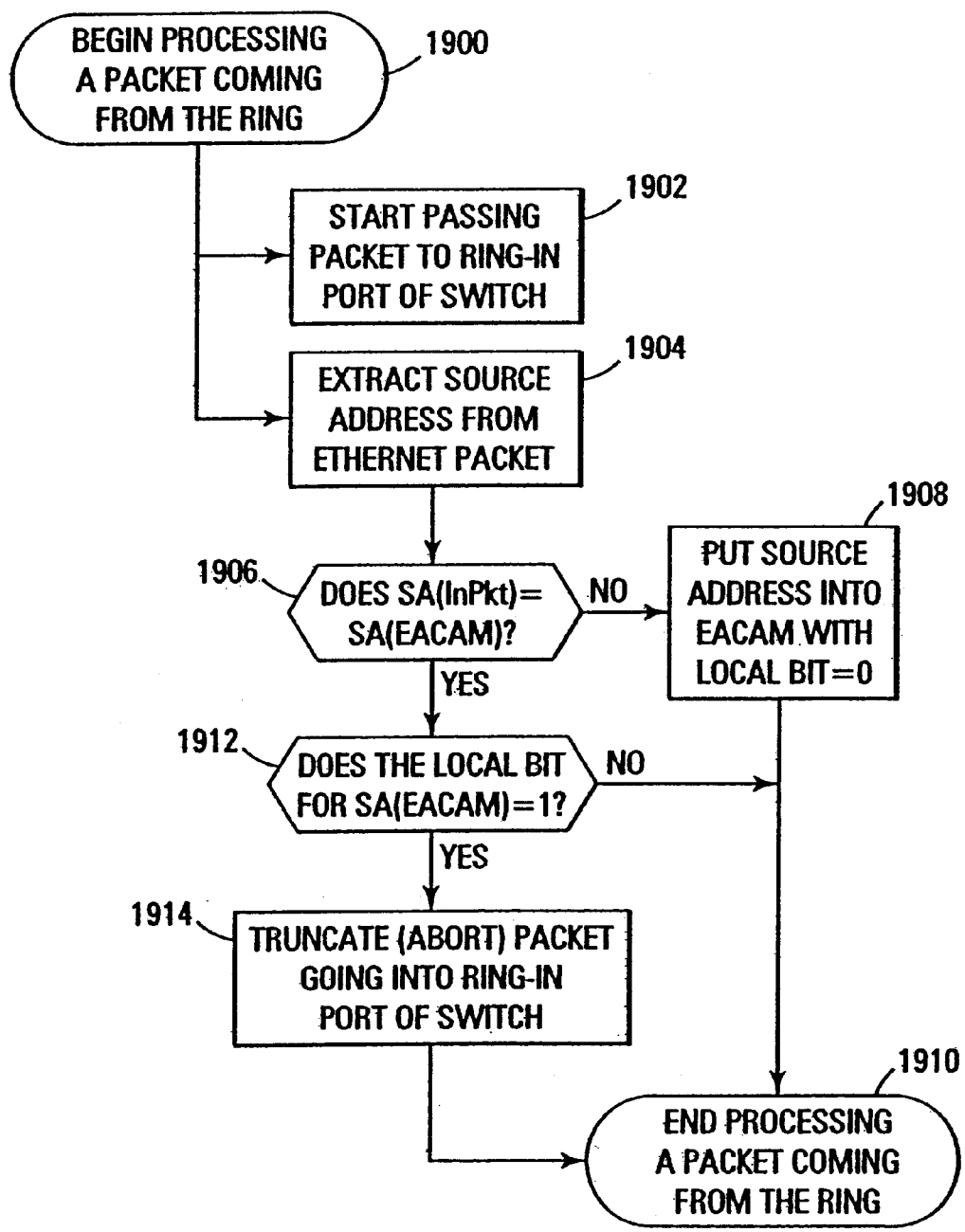
FIG. 11 is a flow chart that illustrates another embodiment of a method for identifying packets with invalid destination addresses according to the teachings of the present invention.

FIG. 11 is a flow chart that illustrates one embodiment of a method for first state machine 1806 of FIG. 10 according to the teachings of the present invention. The method begins processing a data packet block 1900. The method proceeds to block 1902 and provides the data packet on the ring-in port of switch 1802. At block 1904, the method extracts a source address from the data packet.

At block 1906, the method determines whether the source address of the data packet provided to the ring-in port of switch 1802 is in the table of EACAM 1804. If the address has not already been stored in EACAM 1804, the method proceeds to block 1908 and places the address in EACAM 1804 with a local bit indicator set to "0" and the entire data packet is transmitted into switch 1802 without interruption. The "0" indicates that the address is not for a local port of switch 1802. The method terminates the processing of the data packet at block 1910.

If, at block 1906, the source address for the data packet is in EACAM 1804, the method proceeds to block 1912. The method determines whether the local bit indicator is equal to "1," e.g., the address is associated with a local port. If the local bit indicator is "0," then the method terminates at block 1910. If on the other hand, the method determines at block 1912 that the local bit indicator is "1," then the method proceeds to block 1914 and truncates (aborts) the data packet going into the ring-in port of switch 1802. The method ends at block 1910.

An alternative embodiment can use two separate CAM memories rather than one CAM with a bit set to "0" or "1" to indicate ring versus local port addresses. Such an embodiment is used by example below in FIG. 14. Further, values other than "0" and "1" can be used to differentiate between local and ring addresses.

Figure 14:
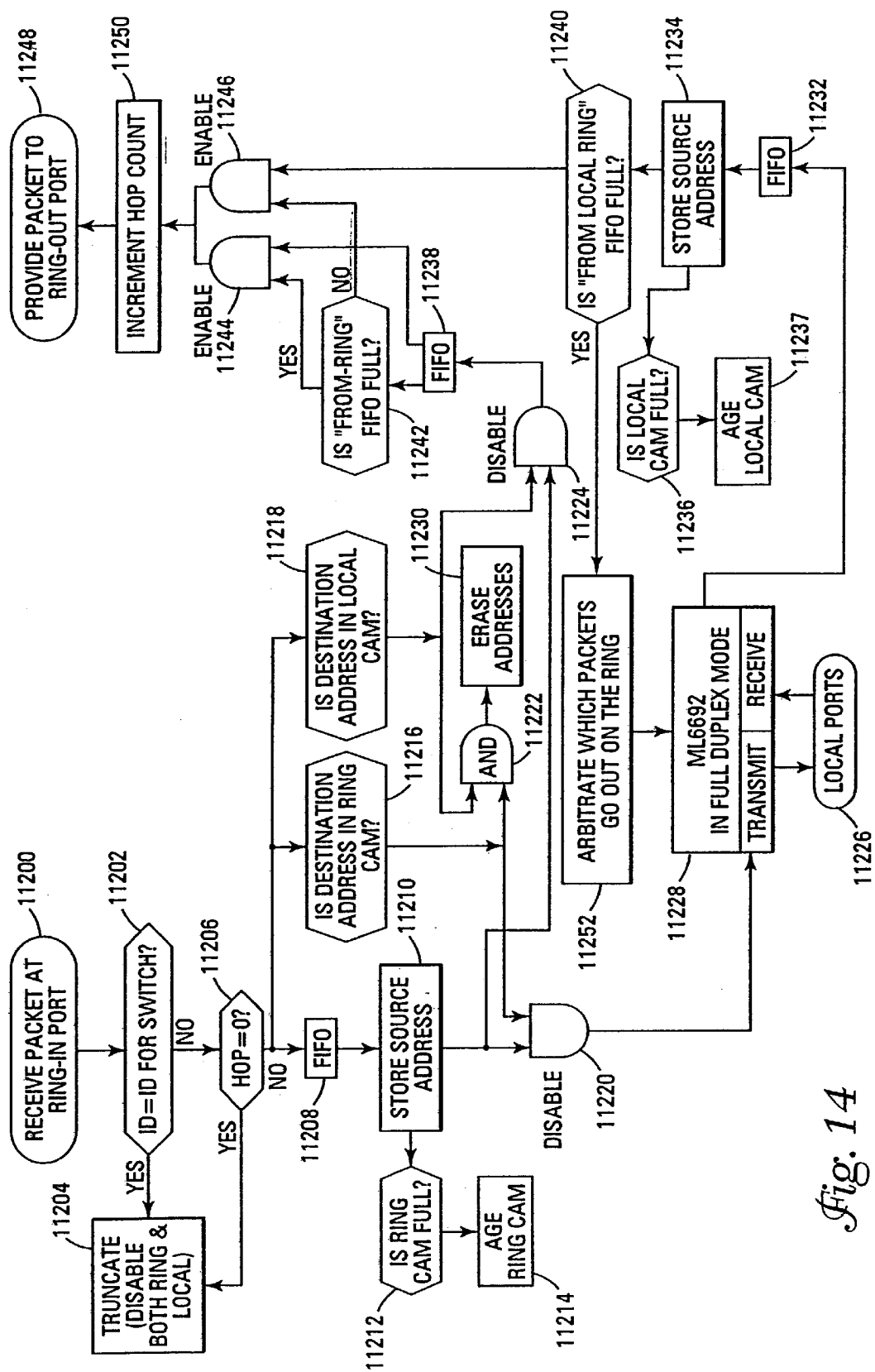
FIG. 14 is a block diagram of a method for processing data packets by a ring switch according to the teachings of the present invention.

FIG. 14 is a block diagram of a method for processing packets in a ring switch according to the teachings of the present invention. In this embodiment, the ring switch uses a counter or an identification number that is appended to data packets in order to determine whether a packet has traveled full circle around a ring network.

At block 11200, packets are received at a ring-in port of a ring switch. At block 11202, the method determines whether the identification number appended to the data packet is the same as the identification number for the ring switch. Identification numbers are appended to data packets as they are received at a local port of the ring switch. If the identification number of the current packet is the same as the identification number of the current ring switch, then the method truncates, aborts or otherwise kills the data packet at block 11204 because it has traveled full circle around the ring network.

At block 11206, the method determines whether a hop counter appended to the data packet is equal to zero. The hop counter is a number that is appended to data packets at the ring switch which originates the data packet. The hop counter is incremented at each subsequent ring switch that processes the data packet and places it back out onto the ring network for transmission to the next ring switch. The hop counter may comprise, for example, an eight bit number such that the counter resets to zero when the data packet has passed through at least 256 ring switches. Alternatively, any other appropriate number of bits can be used for the hop counter. Further, it is understood that the hop counter and the identification number can be used together or separately. If the method determines that the hop counter is set to zero, then the method proceeds to block 11204 because the packet has traveled at least full circle around the ring network.

If at block 11206, the method determines that the packet arriving at the ring-in port has not traveled around the ring, then the packet is processed by the switch to be either transmitted out a local port or out the ring out port. The data packet is stored in a first-in, first-out (FIFO) buffer at block 11208. The source address of the data packet is stored in a memory, most easily a content addressable memory (CAM), for the ring addresses (the Ring CAM) or the aging for the address is updated in the Ring CAM at block 11210. At block 11212, the method determines whether the Ring CAM is full, if so, the oldest addresses in the Ring CAM as judged by the aging information are deleted from the Ring CAM at block 11214. Alternatively, the Ring CAM may simply be reset at block 11214 to erase all the addresses and allow the Ring CAM to relearn the most current addresses.

While the data packet is buffered in the FIFO, the destination address of the data packet is looked-up in the Ring CAM and a CAM that contains the addresses associated with the local ports of the ring switch (the Local CAM) at blocks 11216 and 11218, respectively. At blocks 11216 and 11218, logic signals are produced based on the look-ups in the Ring and Local CAMs. The logic signal from block 11216 is provided to logic gates 11220 and 11222. Further, the logic signal from block 11218 is provided to logic gates 11220 and 11224. Logic gate 11220 is used to pass data packets from the FIFO used at block 11208 to one of the local ports 11226 through switch 11228. It is noted that in this embodiment switch 11228 comprises a typical Ethernet physical interface chip such as an ML6692 switch from Microlinear in Full Duplex mode. Logic gate 11222 is used to erase addresses at block 11230 when the address is found in both the Ring and the Local CAM. This happens when a network device has been move from one switch on the ring to another switch on the ring. Erasing the addresses allows the system to relearn the new location of the device. Finally, logic gate 11224 is used to pass data packets from the FIFO used at block 11208 to the ring-out port through another FIFO, "From-Ring FIFO," at block 11238.

The method of FIG. 14 also accounts for the processing of data packets received at local ports 11226. Such data packets are passed through switch 11228 to a "From-Local" FIFO at block 11232. At block 11234, the source address of the data packet is stored in a memory, most easily a CAM, the Local CAM or the aging for the address is updated in the Local CAM. At block 11236, the method determines whether the Local CAM is full and, if so, the oldest addresses, based on the aging information, are deleted from the CAM at block 11238. Alternatively, the Local CAM may simply be reset at block 11238 to erase all addresses and allow the Local CAM to relearn the most current addresses. For both the Local CAM and the Ring Cam, other forms of aging, such as deleting addresses that have not been used for 5 minutes, or another appropriate period of time may be used. The same is true for the aging requirements of all the other embodiments described in this specification.

The method places data packets from the From-Local and From-Ring FIFOs out onto the ring through the ring-out port. Decisional block 11240 generates a logic signal that controls access to the ring-out port for data packets from the From-Local and From-Ring FIFOs. If the From-Ring FIFO is full, logic gate 11244 is enabled and logic gate 11246 is disabled. Thus, data packets from the From-Ring FIFO are provided out the ring-out port at block 11248 after the hop count is incremented at block 11250. If the From-Ring FIFO is not full, logic gate 11246 is enabled and logic gate 11244 is disabled. Thus, data packets from the From-Local FIFO are provided out the ring-out port at block 11248 after the hop count is incremented at block 11250.

It is noted that at block 11252, a state machine is used to arbitrate the placement of packets onto the ring-out port from the From-Local buffer and the From-Ring buffer when both buffers are full. In one implementation, if the From-Local buffer exceeds a threshold, e.g., half-full, a signal is sent to the local ports to back-off from transmitting more packets to the From-Local FIFO until the From-Local FIFO moves down below the threshold.

It is also noted that if the address of a packet received at the ring-in port is not in either the Local CAM or the Ring CAM, that the packet is "broadcast" to the both the local ports and the ring-out port since neither gate 11220 nor gate 11224 would be disabled based on the output of decisional blocks 11216 and 11218.

Figure 15:
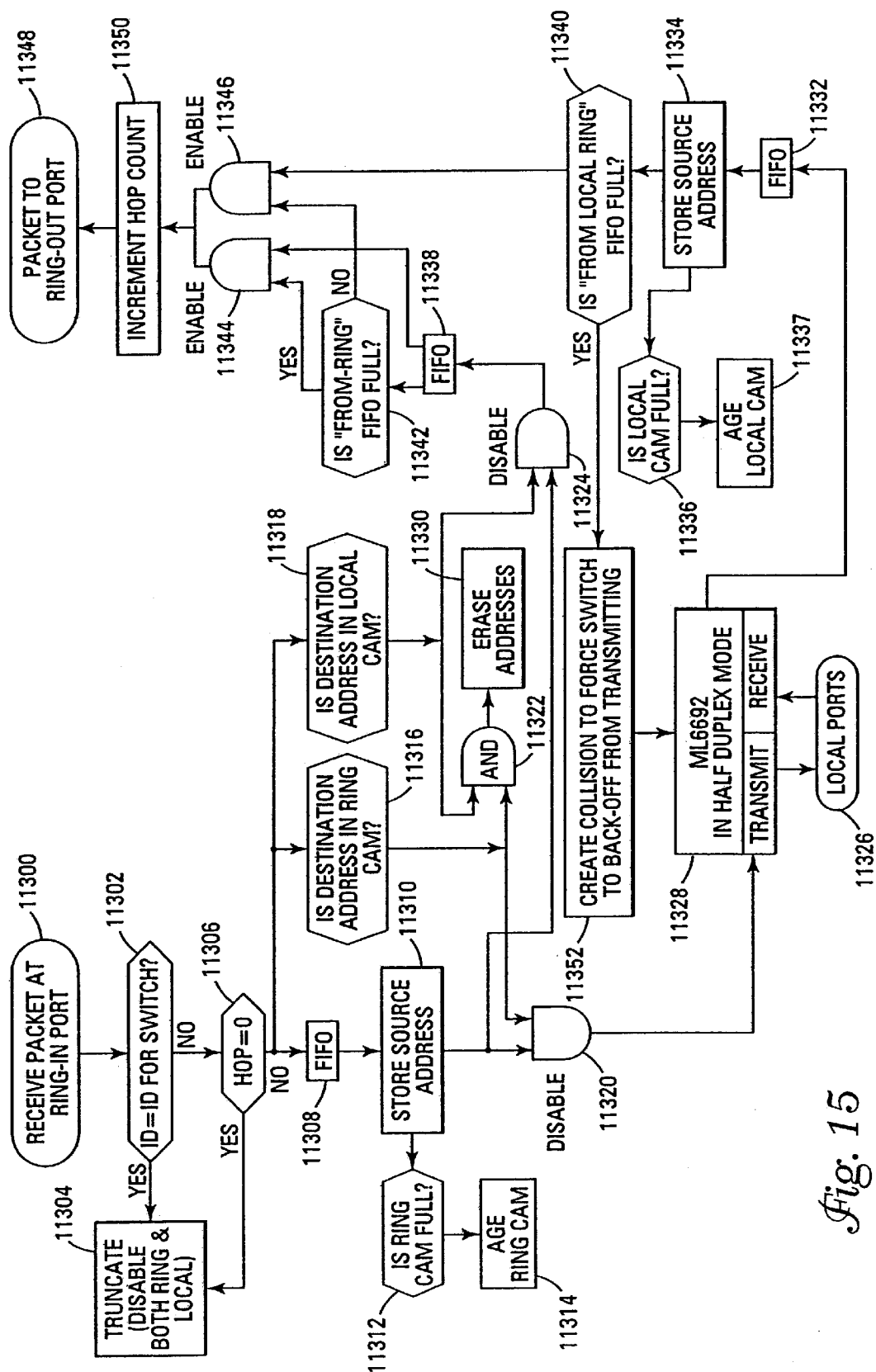
FIG. 15 is a block diagram of another method for processing data packets by a ring switch according to the teachings of the present invention.

FIG. 15 is a block diagram of a method for processing packets in a ring switch according to the teachings of the present invention. In this embodiment, the ring switch uses a counter or an identification number that is appended to data packets in order to determine whether a packet has traveled full circle around a ring network.

At block 11300, packets are received at a ring-in port of a ring switch. At block 11302, the method determines whether the identification number appended to the data packet is the same as the identification number for the ring switch. Identification numbers are appended to data packets as they are received at a local port of the ring switch. If the identification number of the current packet is the same as the identification number of the current ring switch, then the method kills the data packet at block 11304 because it has traveled full circle around the ring network.

At block 11306, the method determines whether a hop counter appended to the data packet is equal to zero. The hop counter is a number that is appended to data packets at the ring switch which originates the data packet. The hop counter is incremented at each subsequent ring switch that processes the data packet and places it back out onto the ring network for transmission to the next ring switch. The hop counter may comprise, for example, an eight bit number such that the counter resets to zero when the data packet has passed through at least 256 ring switches. Alternatively, any other appropriate number of bits can be used for the hop counter. Further, it is understood that the hop counter and the identification number can be used together or separately. If the method determines that the hop counter is set to zero, then the method proceeds to block 11304 because the packet has traveled at least full circle around the ring network.

If at block 11306, the method determines that the packet arriving at the ring-in port has not traveled around the ring, then the packet is processed by the switch to be either transmitted out a local port or out the ring out port. The data packet is stored in a first-in, first-out (FIFO) buffer at block 11308. The source address of the data packet is stored in a memory, most easily a content addressable memory (CAM) for the ring addresses (the Ring CAM) or the aging for the address is updated in that memory at block 11310. At block 11312, the method determines whether the Ring CAM is full, if so, the Ring CAM is aged, by deleting the oldest addresses as determined by the aging information in the memory at block 11314. Alternatively the Ring CAM may simply be reset at block 11314. This erases all of the addresses in the memory allowing the memory to relearn the most current addresses.

While the data packet is buffered in the FIFO, the destination address of the data packet is looked-up in the Ring CAM and a CAM that contains the addresses associated with the local ports of the ring switch (the Local CAM) at blocks 11316 and 11318, respectively. At blocks 11316 and 11318, logic signals are produced based on the look-ups in the Ring and Local CAMs. The logic signal from block 11316 is provided to logic gates 11320 and 11322. Further, the logic signal from block 11318 is provided to logic gates 11320 and 11324. Logic gate 11320 is used to pass data packets from the FIFO used at block 11308 to one of the local ports 11326 through switch 11328. It is noted that in this embodiment switch 11328 comprises a typical Ethernet physical layer interface chip such as an ML6692 switch from Microlinear in Half Duplex mode. Logic gate 11322 is used to erase addresses at block 11330 when the address is found in both the Ring and the Local CAM. Finally, logic gate 11324 is used to pass data packets from the FIFO used at block 11308 to the ring-out port through another FIFO, "From-Ring FIFO," at block 11338.

The method of FIG. 15 also accounts for the processing of data packets received at local ports 11326. Such data packets are passed through switch 11328 to a "From-Local" FIFO at block 11332. At block 11334, the source address of the data packet is stored in the Local CAM or the aging for the address is updated in the Local CAM. At block 11336, the method determines whether the Local CAM is full and, if so, the Local CAM is aged at block 11338. This may be done by erasing the oldest addresses as determined by the aging information stored in the memory, or alternatively the memory may be simply reset at block 11338. This erases all the addresses and allows the CAM to relearn the most current addresses.

A variety of other aging schemes may be used by both the Ring CAM and the Local CAM, such as periodically erasing addresses older than 5 minutes or some other appropriate time. Furthermore, both the method in FIG. 14 and the method in FIG. 15 can be implemented in a single memory or CAM for both ring and local addresses. While using a single memory would lower the cost of manufacture, using two memories greatly simplifies the timing in the logic, making the circuitry easier to design.

The method places data packets from the From-Local and From-Ring FIFOs out onto the ring through the ring-out port. Decisional block 11340 generates a logic signal that controls access to the ring-out port for data packets from the From-Local and From-Ring FIFOs. If the From-Ring FIFO is full, logic gate 11344 is enabled and logic gate 11346 is disabled. Thus, data packets from the From-Ring FIFO are provided out the ring-out port at block 11348 after the hop count is incremented at block 11350. If the From-Ring FIFO is not full, logic gate 11346 is enabled and logic gate 11344 is disabled. Thus, data packets from the From-Local FIFO are provided out the ring-out port at block 11348 after the hop count is incremented at block 11350.

It is noted that at block 11352, collisions are created to force switch 11328 to back off from transmitting when the From-Local buffer is full.

It is also noted that if the address of a packet received at the ring-in port is not in either the Local CAM or the Ring CAM, that the packet is "broadcast" to the both the local ports and the ring-out port since neither gate 11320 nor gate 11324 would be disabled based on the output of decisional blocks 11316 and 11318.

Ring switches of the type described herein can be interconnected to form a ring using any appropriate method for transmitting data between switches. This includes without limitation, wireless, wired, printed wire, semiconductor vias, optical fiber and other transmission techniques. Further, the various steps of the methods described herein can be implemented in software, firmware, or hardware. Further, embodiments of the present invention include a single integrated circuit that is designed to perform the various functions described above.

Alternatively, a modified conventional switch can be used with additional circuitry as shown, for example, in FIGS. 7, 10, 14 and 15. Further, the various techniques described for identifying packets that have traveled around the ring network can be used with ring switches that use either one bidirectional ring port or ring-in and ring-out ports. Further, the local ports can be other than Ethernet ports, as long as they contain a source address, destination address and data payload. It is also noted that varieties of memory devices other than CAMs can be used to implement the address tables according to the teachings of the present invention.

The various aging methods described throughout the specification can be used with any of the embodiments. Further, other well known aging methods can be substituted in place of the described methods without departing from the spirit and scope of the present invention. Further, it is understood that each of the embodiments will work with either a single address table for a ring switch or with multiple address tables. It is further understood that in each of the embodiments described above any one or more of the hop counter, switch identification signal or looking for a source address in an address table for a local port can be used to remove packets that have traveled full circle around the ring.

In every case that a FIFO, CAM or other storage device is specified above, it is noted that a random access memory could be used with pointers to individual buffers or locations. Additionally, a variety of services can be provided over the ring network by prepending, postpending or including or postpending identifiers or "tags" to packets transported by the network. For example, services such as virtual local area networks (VLANs), quality of service (QOS) and other services can be implemented through the use of such tags.

CONCLUSION

A telecommunications network in various embodiments has been described. In each embodiment, the network uses a ring of ring switches (defined above) to provide a transport mechanism for data packets that is transparent to the data and protocols contained in the data packets. This transport mechanism is simple and low cost to implement. Such networks can provide access to the Internet for subscribers with a cable modem hook-up to a cable network or a DSL modem connection to a copper wire DSL enabled telephone network. The network described is easily scalable by the addition of ring switches at the primary site.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. For example, multiple ring switches can be used in each location in the ring to increase the bandwidth of the network. Further, various modems, conventional and later developed, can be used with the subscriber's computers to gain access to the network. Further, the local networks can be copper wire networks with a digital subscriber loop interface. Further, packets can be transmitted over the ring between local ports of ring switches with or without conversion. The networks described can also support multicasting of data packets using, for example, the VLAN common identifier technique described in Section III above.

What is claimed is:

1. A telecommunications network comprising:

a primary site coupled to the Internet;

at least one secondary site that provides connections over a local network to and from subscribers;

the primary site and the at least one secondary site each including at least one ring switch, wherein the ring switches are interconnected to form a transport ring; and the ring switches each using at least one table that tracks the identity of network devices associated with each port of the ring switch based on source identifiers of data packets received at the ports of the ring switch and wherein data packets received at a ring port that are not destined for a network device associated with a local port of the ring switch are switched to another ring switch based on the at least one table without the use of a token or encapsulating the data packet.

2. The network of claim 1, wherein the primary site includes a router, the router providing Ethernet packets to the ring switch of the primary site.

3. The network of claim 1, wherein the primary site includes at least two ring switches that selectively communicate with the ring switches at the secondary sites.

4. The network of claim 1, and further including a ring of transceivers coupled to the ring switches and interconnected by optical fibers.

5. The network of claim 4, wherein the ring of transceivers are multichannel transceivers.

6. The network of claim 1, wherein the primary site includes a router.

7. The network of claim 1, wherein the primary site includes at least one server.

8. The network of claim 1, and further comprising at least one cable modem head end system coupled to a local port of one of the at least one secondary site that communicates data packets to and from subscribers over a local network.

9. A method for providing access to the Internet, the method comprising:
    receiving a request for data from a destination network device;
    receiving the requested data from the Internet;
    placing packets that contain the requested data on a ring network that includes ring switches that each use a table adapted to self-learn which network devices are associated with each port of the ring switch;
    selectively switching the packets around the ring network based on a destination identifier of the packets using the table without the use of a token or encapsulating the data packet; and
    removing the packets from the ring at a local port of the ring switch when the destination identifier and the table for the ring switch indicate that the destination network device is located on a local port of the ring switch.

10. The method of claim 9, wherein receiving the request comprises receiving a request at a cable modem head end system coupled to one of the ring switches.

11. The method of claim 9, wherein receiving the requested data comprises receiving the requested data at a router coupled to one of the ring switches.

12. The method of claim 9, wherein placing packets that contain the requested data on a ring network comprises placing Ethernet packets without conversion on the ring network.

13. The method of claim 9, wherein selectively switching the packets comprises selectively switching the packets based on a Media Access Control (MAC) address.

14. The method of claim 9, wherein selectively switching the packets comprises selectively switching the packets based on an Internet Protocol (IP) address.

15. The method of claim 9, wherein receiving the request comprises receiving a request over a copper wire network with a digital subscriber loop interface.

16. A network comprising:
    a primary site that is coupled to the Internet;
    at least on secondary site that provides access to subscribers; and
    a ring of ring switches that communicatively couple the primary site and the at least one secondary site in a ring, each ring switch having a table adapted to self-learn network devices associated with each port of the ring switch such that the ring switch associates destination identifiers with ports of the ring switch to switch data packets between the Internet and the subscribers based on at lease one destination identifier in the data packets without the use of a token or encapsulating the data packets.

17. The network of claim 16, wherein the primary site includes a router, the router providing Ethernet packets to the ring switch of the primary site.

18. A The network of claim 16, wherein the primary site includes at least two ring switches that selectively communicate with the ring switches at the at least one secondary site.

19. The network of claim 16, and further including a ring of transceivers coupled to the ring switches and interconnected by optical fibers.

20. The network of claim 19, wherein the ring of transceivers are multichannel transceivers.

21. The network of claim 16, wherein the primary site includes a router.

22. The network of claim 16, wherein the primary site includes at least one server.

23. The network of claim 16, and further comprising at least one cable modem head end system coupled to a local port of one of the at least one secondary site that communicates data packets to and from subscribers over a local network.

24. A method for exchanging data with the Internet, the method comprising:
    placing the data in packets on a ring network that includes ring switches that each include a table adapted to self-learn network devices associated with each port of the ring switch;
    selectively switching the packets around and off the ring network based on destination identifiers of the packets using the table without the use of a token or encapsulating the data packets; and
    selectively removing the packets based on a source identifier when the source identifier is associated with a local port of the ring switch.

25. The method of claim 24, wherein receiving data comprises receiving data at a router coupled to one of the ring switches.

26. The method of claim 24, wherein placing the data in packets comprises placing the data in Ethernet packets without conversion.

27. The method of claim 24, wherein selectively switching the packets comprises selectively switching the packets based on a Media Access Control (MAC) address.

28. The method of claim 24, wherein selectively switching the packets comprises selectively switching the packets based on an Internet Protocol (IP) address.

* * * * *